United States Patent
Tokita et al.

(10) Patent No.: US 6,833,045 B1
(45) Date of Patent: Dec. 21, 2004

(54) RESIN DISPERSION, METHOD OF PREPARING THE SAME, RESIN-COATED METAL SHEET OBTAINED WITH THE SAME, AND PROCESS FOR PRODUCING LAMINATE

(75) Inventors: Suguru Tokita, Yamaguchi (JP); Tadao Saito, Yamaguchi (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/601,893

(22) PCT Filed: Dec. 20, 1999

(86) PCT No.: PCT/JP99/07143

§ 371 (c)(1),
(2), (4) Date: Aug. 9, 2000

(87) PCT Pub. No.: WO00/37558

PCT Pub. Date: Jun. 29, 2000

(30) Foreign Application Priority Data

Dec. 18, 1998 (JP) .......................................... 10/361009

(51) Int. Cl.$^7$ ............................................. C09J 123/18
(52) U.S. Cl. ....................... 156/334; 525/285; 525/301; 525/303
(58) Field of Search ................................ 525/285, 301, 525/303, 309, 242, 333.7; 524/529, 531, 533, 548, 579; 156/334

(56) References Cited

U.S. PATENT DOCUMENTS

| | | | | |
|---|---|---|---|---|
| 3,328,362 A | * | 6/1967 | Roberts et al. | .......... 525/333.7 |
| 3,475,369 A | * | 10/1969 | Blunt | .......................... 156/334 |
| 4,762,890 A | | 8/1988 | Strait et al. | |
| 4,908,411 A | * | 3/1990 | Kinoshita et al. | ............ 525/285 |
| 5,240,544 A | * | 8/1993 | Tanimoto et al. | ......... 156/331.6 |
| 5,252,677 A | * | 10/1993 | Tomita et al. | ............ 525/333.7 |
| 5,705,565 A | | 1/1998 | Hughes et al. | |

FOREIGN PATENT DOCUMENTS

| | | | |
|---|---|---|---|
| EP | 0 770 641 | | 5/1997 |
| EP | 0 866 081 | | 9/1998 |
| JP | 63-378 A | * | 1/1988 |
| JP | 6312651 | | 1/1988 |
| JP | 0391514 | | 4/1991 |
| WO | WO 98 42760 | | 10/1998 |

OTHER PUBLICATIONS

English translation of JP 63–378A.*

* cited by examiner

Primary Examiner—Blaine Copenheaver
Assistant Examiner—John L. Goff
(74) Attorney, Agent, or Firm—Sherman & Shalloway

(57) ABSTRACT

Disclosed is a resin dispersion comprising solid particles of a graft modified ethylene/1-olefin random copolymer dispersed in an organic solvent, which has (a) a specific content of an α-olefin component, (b) a specific intrinsic viscosity (η) and (h) a specific content of a polar monomer component. The resin dispersion of the invention exhibits excellent adhesion properties as an adhesive between polyolefins or metal and polyolefin or as a heat-sealing material, so that the dispersion is effectively used particularly as an adhesive for packaging, an adhesive for lamination, a coating material or a primer.

14 Claims, No Drawings

Ｕ Ｓ６，８３３，０４５Ｂ１

RESIN DISPERSION, METHOD OF PREPARING THE SAME, RESIN-COATED METAL SHEET OBTAINED WITH THE SAME, AND PROCESS FOR PRODUCING LAMINATE

TECHNICAL FIELD

The present invention relates to a resin dispersion useful as a coating or an adhesive, and more particularly to a resin dispersion having excellent low-temperature heat-sealing properties.

BACKGROUND ART

A resin dispersion of modified polypropylene has been proposed as an adhesive between slightly adherent polypropylene and a metal such as aluminum (see Japanese Patent Laid-Open Publication No. 12651/1988). In order to lower the heat-sealing temperature of the resin dispersion in the adhesion process, the present inventors have made studies of polypropylene that is a starting resin and have proposed a resin dispersion of modified polypropylene capable of being heat sealed at a lower temperature than the invented product mentioned above (see Japanese Patent Laid-Open Publication No. 91514/1991).

In the market, however, there are strong demands for simplification of production line and reduction of cost, so that uses of not only polypropylene but also polyethylene as adherends have been studied. On this account, a resin dispersion capable of being heat sealed to polyethylene at a lower temperature has been desired. The present inventors have studied to develop a resin dispersion which exhibits excellent heat-sealing properties when polyethylene is used as an adherend. As a result, they have found that a resin dispersion comprising a specific modified ethylene/α-olefin random copolymer obtained by grafting a polar monomer on an ethylene/α-olefin random copolymer comprising ethylene and an α-olefin of 6 to 20 carbon atoms which is dispersed in an organic solvent, satisfies the above demands. Based on the finding, the present invention has been accomplished.

The present invention has been made to solve such problems associated with the prior art as described above, and it is an object of the invention to provide a resin dispersion, which has excellent low-temperature heat-sealing properties and can be used as an adhesive for polyolefins, particularly polyethylene, and to provide a process for preparing the dispersion and uses of the dispersion.

DISCLOSURE OF THE INVENTION

The resin dispersion according to the invention is a resin dispersion comprising solid particles of a graft modified ethylene/α-olefin random copolymer dispersed in an organic solvent, wherein the graft-modified ethylene/α-olefin random copolymer has the following properties:

(a) the copolymer contains components derived from ethylene and an α-olefin of 6 to 20 carbon atoms, the content of the ethylene component is in the range of 75 to 97% by mol, and the content of the α-olefin component is in the range of 3 to 25% by mol, each content being based on 100% by mol of the total of both components, (b) the intrinsic viscosity (η) as measured in decalin at 135° C. is in the range of 0.2 to 5.0 dl/g, and (h) the copolymer contains a graft component derived from a polar monomer, and the content of the polar monomer graft component is in the range of 0.1 to 15% by weight.

The graft modified ethylene/α-olefin random copolymer preferably further has the following properties:

(c) the glass transition temperature (Tg) is not higher than −40° C., (d) the crystallinity as measured by X-ray diffractometry is less than 30%, and (e) the molecular weight distribution (Mw/Mn) as measured by GPC is not more than 3.

The graft modified ethylene/α-olefin random copolymer preferably further has, in addition to the above properties, the following properties:

(f) the B value as calculated from the following equation is in the range of 1.0 to 1.4:

$$B \text{ value} = POE/(2PO \cdot PE)$$

wherein POE, 2PO and PE are each a parameter determined from the $^{13}$C-NMR spectrum, PE and PO are a molar fraction of ethylene and a molar fraction of the α-olefin, respectively, to the total number of moles of the ethylene component and the α-olefin contained in the modified ethylene/αolefin random copolymer, and POE is a proportion of the number of ethylene/α-olefin alternating sequences to the number of all dyad sequences.

The process for preparing a resin dispersion according to the present invention comprises grafting a polar monomer on an unmodified ethylene/α-olefin random copolymer having the following properties:

(a') the copolymer contains components derived from ethylene and an α-olefin of 6 to 20 carbon atoms, the content of the ethylene component is in the range of 75 to 97% by mol, and the content of the α-olefin component is in the range of 3 to 25% by mol, each content being based on 100% by mol of the total of both components, and (b') the intrinsic viscosity (η) as measured in decalin at 135° C. is in the range of 0.2 to 5.0 dl/g, to prepare a graft modified ethylene/α-olefin random copolymer containing 0.1 to 15% by weight of a graft component derived from the polar monomer, and then dispersing solid particles of the graft modified copolymer in an organic solvent.

In the process for preparing a resin dispersion according to the invention, the unmodified ethylene/α-olefin random copolymer preferably further has the following properties:

(c') the glass transition temperature (Tg) is not higher than −40° C., (d') the crystallinity as measured by X-ray diffractometry is less than 30%, and (e') the molecular weight distribution (Mw/Mn) as measured by GPC is not more than 3.

In the above process, the unmodified ethylene/α-olefin random copolymer preferably furthermore has the following properties:

(f') the B value as calculated from the following equation is in the range of 1.0 to 1.4:

$$B \text{ value} = POE/(2PO \cdot PE)$$

wherein POE, 2PO and PE are each a parameter determined from the $^{13}$C-NMR spectrum, PE and PO are a molar fraction of ethylene and a molar fraction of the α-olefin, respectively, to the total number of moles of the ethylene component and the α-olefin contained in the modified ethylene/α-olefin random copolymer, and POE is a proportion of the number of ethylene/α-olefin alternating sequences to the number of all dyad sequences.

In the above process, the unmodified ethylene/α-olefin random copolymer preferably is a linear ethylene/α-olefin random copolymer having the following properties:

(g') the ratio (gη* (=(η)/(η)blank) of the intrinsic viscosity (η) measured as the property (b') to the intrinsic viscosity (η)blank of a linear ethylene/propylene copolymer having the same weight-average molecular weight (by light scattering method) as that of the unmodified ethylene/α-olefin random copolymer and having an ethylene content of 70% by mol is a value exceeding 0.95.

The process for producing a resin-coated metal plate according to the present invention comprises applying the above-mentioned resin dispersion to a metal plate to form a coating film.

The process for producing a laminate according to the present invention comprises applying the above-mentioned resin dispersion to a metal plate to form an adhesive layer and laminating a polyolefin sheet or film on the metal plate by means of the adhesive layer.

BEST MODE FOR CARRYING OUT THE INVENTION

The resin dispersion according to the invention is a resin dispersion wherein a solid graft modified ethylene/α-olefin random copolymer obtained by graft modification with a polar monomer is dispersed in an organic solvent. The graft modified ethylene/α-olefin random copolymer has (a) specific contents of ethylene and α-olefin components, (b) a specific intrinsic viscosity (η) and (h) a specific content of a polar monomer graft component.

In the process for preparing a resin dispersion according to the invention, an unmodified ethylene/α-olefin random copolymer obtained by random copolymerizing ethylene and an α-olefin of 6 to 20 carbon atoms is graft modified with a polar monomer, and then the graft modified copolymer is dispersed in an organic solvent to prepare a resin dispersion.

The present invention is described in more detail hereinafter.

Modified Ethylene/α-olefin Random Copolymer

The modified ethylene/α-olefin random copolymer for use in the resin dispersion of the invention has (a) a specific content of an α-olefin component, (b) a specific intrinsic viscosity (η) and (h) a specific content of a polar monomer (graft monomer) component.

Examples of the α-olefins of 6 to 20 carbon atoms in the modified ethylene/α-olefin random copolymer include 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene. These α-olefins may be used singly or in combination of two or more kinds.

Of the α-olefins, preferable are α-olefins of 6 to 20 carbon atoms, more preferable are α-olefins of 6 to 12 carbon atoms, and particularly preferable is an α-olefin of 8 carbon atoms such as 1-octene.

In the graft modified ethylene/α-olefin random copolymer in the resin dispersion of the invention, the content (a) of the α-olefin component is in the range of 3 to 25% by mol, preferably 6 to 25% by mol, more preferably 5 to 15% by mol, based on 100% by mol of the total of the ethylene component and the α-olefin component.

The graft modified ethylene/α-olefin random copolymer has (b) an intrinsic viscosity (η), as measured in decalin at 135° C., of 0.2 to 5.0 dl/g, preferably 0.5 to 5.0 dl/g, more preferably 0.8 to 3.0 dl/g.

In addition to the specific α-olefin content (a) and the specific intrinsic viscosity (η) (b) mentioned above, the content (h) of a component derived from a polar monomer in the graft modified ethylene/α-olefin random copolymer is in the range of 0.1 to 15% by weight, preferably 0.5 to 10% by weight, particularly 0.6 to 8% by weight.

By the use of the graft modified ethylene/α-olefin random copolymer having the above properties (a), (b) and (h) in a resin dispersion, adhesion to various adherend materials such as various olefin resin materials can be ensured and there is little variability of adhesion among adherend materials, so that the resin dispersion is extremely advantageous in practical use.

In the present invention, the graft modified ethylene/α-olefin random copolymer having the above properties (a), (b) and (h) preferably has (c) a glass transition temperature (Tg), as measured by DSC (differential scanning calorimeter), of not higher than −40° C., particularly not higher than −45° C., more particularly −45 to −80° C.

The graft modified ethylene/α-olefin random copolymer preferably has a melting point of not higher than 90° C.

The graft modified ethylene/α-olefin random copolymer preferably has (d) a crystallinity, as measured by X-ray diffractometry, of less than 30%, particularly not more than 25%.

The graft modified ethylene/α-olefin random copolymer preferably has (e) a molecular weight distribution (Mw/Mn), as measured by GPC, of not more than 3.0, particularly not more than 2.5, more particularly 2.5 to 1.2.

Further, the graft modified ethylene/α-olefin random copolymer preferably has (f) a parameter (B value), which is determined by a $^{13}$C-NMR method and indicates randomness of a monomer sequence distribution in the copolymer, of 1.0 to 1.4, particularly 1.0 to 1.3.

The B value of an ethylene/α-olefin random copolymer is an indication of composition distribution of components derived from monomers in the sequences in the copolymer, and is calculated from the following equation:

$$B \text{ value} = POE/(2PO \cdot PE)$$

wherein PE and PO are a molar fraction of an ethylene component and a molar fraction of an α-olefin component, respectively, contained in an unmodified ethylene/α-olefin random copolymer, and POE is a proportion of the number of ethylene/α-olefin alternating sequences to the number of all dyad sequences.

The parameters PE, PO and POE, which are variables to determine the B value, are specifically determined by measuring a $^{13}$C-NMR spectrum in the following manner.

In a test tube having a diameter of 10 mm, about 200 mg of an ethylene/α-olefin random copolymer is homogeneously dissolved in 1 ml of hexachlorobutadiene to prepare a sample, and a $^{13}$C-NMR spectrum of the sample is measured under the following measuring conditions.

Measuring Conditions

Measuring temperature: 120° C.

Measuring frequency: 20.05 MHz

Spectral width: 1500 Hz

Filter width: 1500 Hz

Pulse repetition time: 4.2 sec

Pulse width: 7 μsec

Number of integration times: 2000–5000

The PE, PO and POE values can be determined from the $^{13}$C-NMR spectrum obtained as above in accordance with the reports by G. J. Ray (Macromolecules 10,773 (1977)), J. C. Randall (Macro-molecules, 15,353 (1982)) and K. Kimura (Polymer, 25,4418 (1984)).

The B value calculated from the above equation is 2 when both monomer components are alternatingly distributed in the graft modified ethylene/α-olefin random copolymer, and the B value is 0 in case of a complete block copolymer wherein both monomer components are completely separated.

In the present invention, a linear or long-chain branched graft modified ethylene/α-olefin random copolymer is preferably used as the graft modified ethylene/α-olefin random copolymer having the above properties.

Unmodified Ethylene/α-olefin Random Copolymer

The graft modified ethylene/α-olefin random copolymer for use in the invention can be prepared by graft modifying an unmodified ethylene/α-olefin random copolymer obtained by random copolymerization of ethylene and an α-olefin of 6 to 20 carbon atoms.

The linear or long-chain branched graft modified ethylene/α-olefin random copolymer preferably used in the invention can be prepared using a linear or long-chain branched unmodified ethylene/α-olefin random copolymer in the graft modification.

The unmodified ethylene/α-olefin random copolymer has a specific α-olefin content (a') and a specific intrinsic viscosity (b'), and desirably further has a specific glass transition temperature (c'), a specific crystallinity (d'), a specific molecular weight distribution (e') and a specific B value (f').

The properties (a') to (f') of the unmodified ethylene/α-olefin random copolymer are identical with the α-olefin content (a), the intrinsic viscosity (b), the glass transition temperature (c), the crystallinity (d), the molecular weight distribution (e) and the B value (f) of the graft modified ethylene/α-olefin random copolymer previously described.

The linear unmodified ethylene/α-olefin random copolymer has (g') a gη* value, as determined from its intrinsic viscosity (η), of more than 0.95. The gη* value is defined as follows:

$$g\eta^* = (\eta)/(\eta)blank$$

wherein (η) is an intrinsic viscosity measured as the aforesaid property (b'), and (η)blank is an intrinsic viscosity of a linear ethylene/propylene copolymer having the same weight-average molecular weight (by light scattering method) as that of the ethylene/α-olefin random copolymer having the intrinsic viscosity (q) and having an ethylene content of 70% by mol.

The long-chain branched unmodified ethylene/α-olefin random copolymer which is preferably used in the present invention has (g') a gη* value of 0.2 to 0.95, preferably 0.4 to 0.9, more preferably 0.5 to 0.85. The gη* value is determined by the above-mentioned method.

A gη* value of not more than 0.95 indicates that long-chain branches are formed in the molecules of the ethylene/α-olefin random copolymer.

Preparation of the unmodified ethylene/α-olefin random copolymer and the graft modified ethylene/α-olefin random copolymer using the unmodified copolymer are described below in detail.

Preparation of Unmodified Ethylene/α-olefin Random Copolymer

The unmodified ethylene/α-olefin random copolymer can be prepared by random copolymerizing ethylene and an α-olefin of 6 to 20 carbon atoms in the presence of a vanadium catalyst comprising a soluble vanadium compound and an alkylaluminum halide compound or a zirconium catalyst comprising a metallocene compound of zirconium and an organoaluminum oxy-compound.

The linear or long-chain branched ethylene/α-olefin random copolymer can be prepared by random copolymerizing ethylene and an α-olefin of 6 to 20 carbon atoms in the presence of a metallocene catalyst containing a specific metallocene compound.

The vanadium catalyst, the zirconium catalyst, the metallocene catalyst, and polymerization processes using these catalysts are described below.

Vanadium Catalyst and Zirconium Catalyst

Examples of the soluble vanadium compounds used in the vanadium catalyst include vanadium tetrachloride, vanadium oxytrichloride, vanadium monoethoxydichloride, vanadium triacetylacetonate and oxyvanadium triacetylacetonate.

Examples of the alkylaluminum halide compounds used in the vanadium catalyst include ethylaluminum dichloride, diethylaluminum monochloride, ethylaluminum sesquichloride, diethylaluminum monobromide, diisobutylaluminum monochloride, isobutylaluminum dichloride and isobutylaluminum sesquichloride.

Examples of the metallocene compounds of zirconium used in the zirconium catalyst include ethylenebis(indenyl)zirconium dibromide, dimethylsilylenebis(2-methylindenyl) zirconium dichloride, bis(cyclopentadienyl)zirconium dibromide and bis(dimethylcyclopentadienyl)zirconium dichloride.

The organoaluminum oxy-compound used in the zirconium catalyst is, for example, an aluminoxane or a benzene-insoluble organoaluminum oxy-compound.

The zirconium catalyst may contain an organoaluminum compound in addition to the metallocene compound of zirconium and the organoaluminum oxy-compound. Examples of the organoaluminum compounds include triisobutylaluminum, dimethylaluminum chloride and methylaluminum sesquichloride.

Copolymerization of ethylene and an α-olefin using the vanadium catalyst or the zirconium catalyst can be carried out in a state of solution or suspension or an intermediate state therebetween, and in each case, it is preferable to use an inert solvent as a reaction medium.

Metallocene Catalyst

There is no specific limitation on the metallocene catalyst, except that it contains a metallocene compound (A). For example, the metallocene catalyst may be formed from the metallocene compound (A), and an organoaluminum oxy-compound (B) and/or a compound (C) which reacts with the metallocene compound (A) to form an ion pair; or may be formed from the metallocene compound (A), an organoaluminum oxy-compound (B) and/or a compound (C) which reacts with the metallocene compound (A) to form an ion pair, and an organoaluminum compound (D).

Metallocene compound (A)

The metallocene compound (A) used in the preparation of the linear ethylene/α-olefin random copolymer is, for example, a compound represented by the following formula (I).

$$ML_x \tag{I}$$

In the formula (I), M is a transition metal selected from Group IVB of the periodic table, specifically zirconium, titanium or hafnium, and x is a valence of the transition metal.

L is a ligand coordinated to the transition metal, and of the ligands, at least one ligand L is a ligand having cyclopentadienyl skeleton. The ligand having cyclopentadienyl skeleton may have a substituent group.

Examples of the ligands having cyclopentadienyl skeleton include a cyclopentadienyl group; alkyl- or cycloalkyl-substituted cyclopentadienyl groups, such as methylcyclopentadienyl, ethylcyclopentadienyl, n- or i-propylcyclopentadienyl, n-, i-, sec- or t-butylcyclopentadienyl, hexylcyclopentadienyl, octylcyclopentadienyl, dimethylcyclopentadienyl, trimethylcyclopentadienyl, tetramethylcyclopentadienyl, pentamethylcyclopentadienyl, methylethylcyclopentadienyl, methylpropylcyclopentadienyl, methylbutylcyclopentadienyl, methylhexylcyclopentadienyl, methylbenzylcyclopentadienyl, ethylbutylcyclopentadienyl, ethylhexylcyclopentadienyl and methylcyclohexylcyclopentadienyl; an indenyl group; a 4,5,6,7-tetrahydroindenyl group; and a fluorenyl group.

These groups may be substituted with halogen atoms or trialkylsilyl groups. Of the above groups, alkyl-substituted cyclopentadienyl groups are particularly preferable.

When the compound represented by the formula (I) contains two or more groups having cyclopentadienyl skeleton as the ligands L, two of them may be bonded through an alkylene group such as ethylene or propylene, a substituted alkylene group such as isopropylidene or diphenylmethylene, a silylene group, or a substituted silylene group such as dimethylsilylene, diphenylsilylene or methylphenylsilylene.

The ligand L other than the ligand having cyclopentadienyl skeleton (sometimes referred to as "another L" simply hereinafter) is, for example, a hydrocarbon group of 1 to 12 carbon atoms, an alkoxy group, an aryloxy group, a halogen atom, a hydrogen atom or a sulfonic acid-containing group ($-SO_3R^a$ wherein $R^a$ is an alkyl group, a halogen-substituted alkyl group, an aryl group, a halogen-substituted aryl group or an alkyl-substituted aryl group).

Examples of the hydrocarbon groups of 1 to 12 carbon atoms include alkyl groups, cycloalkyl groups, aryl groups and aralkyl groups. More specifically, there can be mentioned alkyl groups, such as methyl, ethyl, n-propyl, isopropyl, n-butyl, isobutyl, sec-butyl, t-butyl, pentyl, hexyl, octyl, decyl and dodecyl; cycloalkyl groups, such as cyclopentyl and cyclohexyl; aryl groups, such as phenyl and tolyl; and aralkyl groups, such as benzyl and neophyl.

Examples of the alkoxy groups include methoxy, ethoxy, n-propoxy, isopropoxy, n-butoxy, isobutoxy, sec-butoxy, t-butoxy, pentoxy, hexoxy and octoxy.

An example of the aryloxy group is phenoxy.

Examples of the sulfonic acid-containing groups ($-SO_3R^a$) include methanesulfonato, p-toluenesulfonato, trifluoromethanesulfonato and p-chlorobenzenesulfonato.

The halogen atom is fluorine, chlorine, bromine or iodine.

When the valence of the transition metal is 4, the metallocene compound represented by the above formula is more specifically represented by the following formula (Ia):

$$R^2{}_k R^3{}_l R^4{}_m R^5{}_n M \tag{Ia}$$

wherein M is the above-mentioned transition metal; $R^2$ is a group (ligand) having cyclopentadienyl skeleton; $R^3$, $R^4$ and $R^5$ are each independently a group having cyclopentadienyl skeleton or the same as another L in the formula (I); k is an integer of 1 or more; and k+l+m+n=4.

Examples of the metallocene compounds having zirconium as M and containing two ligands having cyclopentadienyl skeleton include bis(cyclopentadienyl)zirconium monochloride monohydride, bis(cyclopentadienyl) zirconium dichloride, bis(cyclopentadienyl)zirconium dibromide, bis(cyclopentadienyl)methylzirconium monochloride, bis(cyclopentadienyl)zirconium phenoxymonochloride, bis(methylcyclopentadienyl) zirconium dichloride, bis(ethylcyclopentadienyl)zirconium dichloride, bis(n-propylcyclopentadienyl)zirconium dichloride, bis(isopropylcyclopentadienyl)zirconium dichloride, bis(t-butylcyclopentadienyl)zirconium dichloride, bis(n-butylcyclopentadienyl)zirconium dichloride, bis(sec-butylcyclopentadienyl)zirconium dichloride, bis(isobutylcyclopentadienyl)zirconium dichloride, bis(hexylcyclopentadienyl)zirconium dichloride, bis(octylcyclopentadienyl)zirconium dichloride, bis (indenyl)zirconium dichloride, bis(4,5,6,7-tetrahydroindenyl)zirconium dichloride, bis(indenyl) zirconium dibromide, bis(cyclopentadienyl)zirconium dimethyl, bis(cyclopentadienyl)zirconium methoxychloride, bis(cyclopentadienyl)zirconium, ethoxychloride, bis (fluorenyl)zirconium dichloride, bis(cyclopentadienyl) zirconiumbis(methanesulfonato), bis(cyclopentadienyl) zirconiumbis(p-toluenesulfonato), bis(cyclopentadienyl) zirconium-bis(trifluoromethanesulfonato), bis (methylcyclopentadienyl)zirconium-bis (trifluoromethanesulfonatod), bis(ethylcyclopentadienyl) zirconium-bis(trifluoromethanesulfonato), bis (propylcyclopentadienyl)zirconium-bis (trifluoromethanesulfonato), bis(butyicyclopentadienyl) zirconium-bis(trifluoromethanesulfonato), bis (hexylcyclopentadienyl)zirconium-bis (trifluoromethanesulfonato), bis(1,3-dimethylcyclopentadienyl)zirconium-bis (trifluoromethanesulfonato), bis(1-methyl-3-ethylcyclopentadienyl)zirconium-bis (trifluoromethanesulfonato), bis(1-methyl-3-propylcyclopentadienyl)zirconium-bis (trifluoromethanesulfonato), bis(1-methyl-3-butylcyclopentadienyl)zirconium-bis (trifluoromethanesulfonato), bis(1,3-dimethylcyclopentadienyl)zirconium dichloride, bis(1-methyl-3-ethylcyclopentadienyl)zirconium dichloride, bis (1-methyl-3-propylcyclopentadienyl)zirconium dichloride, bis(1-methyl-3-butylcyclopentadienyl)zirconium dichloride, bis(1-methyl-3-hexylcyclopentadienyl) zirconium dichloride, bis(1-methyl-3-octylcyclopentadienyl)zirconium dichloride, bis(1-ethyl-3-butylcyclopentadienyl)zirconium dichloride, bis (trimethylcyclopentadienyl)zirconium dichloride, bis (tetramethylcyclopentadienyl)zirconium dichloride, bis (pentamethylcyclopentadienyl)zirconium dichloride, bis (methylbenzylcyclopentadienyl)zirconium dichloride, bis (ethylhexylcyclopentadienyl)zirconium dichloride and bis (methylcyclohexylcyclopentadienyl)zirconium dichloride.

Compounds wherein the 1,3-position substituted cyclopentadienyl group is replaced with a 1,2-position substituted cyclopentadienyl group in the above-mentioned compounds are also employable in the invention. Further, a bridge type metallocene compound wherein at least two of $R^2$, $R^3$, $R^4$ and $R^5$ in the formula (Ia), i.e., $R^2$ and $R^3$, are groups (ligands) having cyclopentadienyl skeleton and said at least two groups are bonded through an alkylene group, a substituted alkylene group, a silylene group or a substituted silylene group is also available. In this case, $R^4$ and $R^5$ are each independently the same as another L described in the formula (I).

Examples of the bridge type metallocene compounds include ethylenebis(indenyl)dimethylzirconium, ethylenebis (indenyl)zirconium dichloride, ethylenebis(indenyl) zirconium-bis(trifluoromethanesulfonato), ethylenebis (indenyl)zirconiumbis(methanesulfonato), ethylenebis (indenyl)zirconiumbis(p-toluenesulfonato), ethylenebis (indenyl)zirconiumbis(p-chlorobenzenesulfonato), ethylenebis(4,5,6,7-tetrahydroindenyl)zirconium dichloride, isopropylidene(cyclopentadienyl-fluorenyl)zirconium dichloride, isopropylidene(cyclopentadienyl-methylcyclopentadienyl)zirconium dichloride, dimethylsilylenebis(cyclopentadienyl)zirconium dichloride, dimethylsilylenebis(methylcyclopentadienyl)zirconium dichloride, dimethylsilylenebis(dimethylcyclopentadienyl) zirconium dichloride, dimethylsilylenebis (trimethylcyclopentadienyl)zirconium dichloride, dimethylsilylenebis(indenyl)zirconium dichloride, dimethylsilylenebis(indenyl)zirconium-bis (trifluoromethanesulfonate), dimethylsilylenebis(4,5,6,7-tetrahydroindenyl)zirconium dichloride, dimethylsilylenebis (cyclopentadienyl-fluorenyl)zirconium dichloride, diphenylsilylenebis(indenyl)zirconium dichloride and methylphenylsilylenebis(indenyl)zirconium dichloride.

A metallocene compound represented by the following formula (Ib), which is described in Japanese Patent Laid-Open Publication No. 268307/1992, is also available.

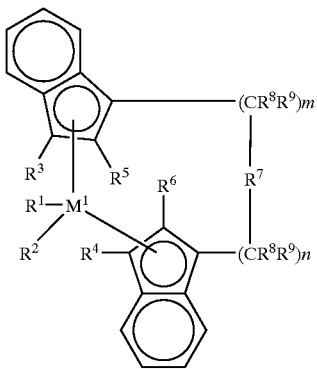

(Ib)

In the formula (Ib), $M^1$ is a metal of Group IVB of the periodic table, specifically titanium, zirconium or hafnium. $R^1$ and $R^2$ may be the same or different and are each a hydrogen atom, an alkyl group of 1 to 10 carbon atoms, preferably 1 to 3 carbon atoms, an alkoxy group of 1 to 10 carbon atoms, preferably 1 to 3 carbon atoms, an aryl group of 6 to 10 carbon atoms, preferably 6 to 8 carbon atoms, an aryloxy group 6 to 10 carbon atoms, preferably 6 to 8 carbon atoms, an alkenyl group of 2 to 10 carbon atoms, preferably 2 to 4 carbon atoms, an arylalkyl group of 7 to 40 carbon atoms, C preferably 7 to 10 carbon atoms, an alkylaryl group of 7 to 40 w carbon atoms, preferably 7 to 12 carbon atoms, an arylalkenyl group of 8 to 40 carbon atoms, preferably 8 to 12 carbon atoms, or a halogen atom, preferably a chlorine atom.

$R^3$ and $R^4$ may be the same or different and are each a hydrogen atom, a halogen atom, preferably a fluorine atom, a chlorine atom, or a bromine atom, an alkyl group of 1 to 10 carbon atoms, preferably 1 to 4 carbon atoms, which may be halogenated, an aryl group of 6 to 10 carbon atoms, preferably 6 to 8 carbon atoms, $-NR^{10}{}_2$ group, $-SR^{10}$ group, $-OSiR^{10}{}_3$ group, $-SiR^{10}{}_3$ group or $-PR^{10}{}_2$ group ($R^{10}$ is a halogen atom, preferably a chlorine atom, an alkyl group of 1 to 10 carbon atoms, preferably 1 to 3 carbon atoms, or an aryl group of 6 to 10 carbon atoms, preferably 6 to 8 carbon atoms).

$R^3$ and $R^4$ are each particularly preferably a hydrogen atom. $R^5$ and $R^6$ may be the same or different, preferably the same, and each of $R^5$ and $R^6$ is the same as each of $R^3$ and $R^4$ but is not a hydrogen atom. $R^5$ and $R^6$ are each preferably an alkyl group of 1 to 4 carbon atoms which may be halogenated, specifically methyl, ethyl, propyl, isopropyl, butyl, isobutyl, trifluoromethyl or the like, preferably methyl.

$R^7$ is represented by:

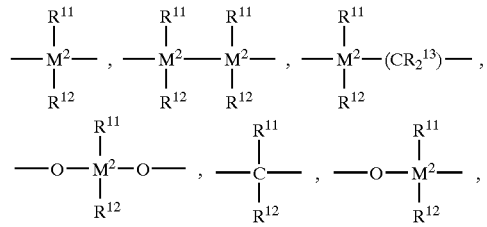

$=BR^{11}$, $=AlR^{11}$, $-Ge-$, $-Sn-$, $-O-$, $-S-$, $=SO$, $=SO_2$, $=NR^{11}$, $=CO$, $=PR^{11}$ or $=P(O)R^{11}$. In these formulas, $R^{11}$, $R^{12}$ and $R^{13}$ may be the same or different and are each a hydrogen atom, a halogen atom, an alkyl group of 1 to 10 carbon atoms, preferably 1 to 4 carbon atoms, more preferably methyl, a fluoroalkyl group of 1 to 10 carbon atoms, preferably $CF_3$ group, an aryl group of 6 to 10 carbon atoms, preferably 6 to 8 carbon atoms, a fluoroaryl group of 6 to 10 carbon atoms, preferably pentafluorophenyl, an alkoxy group of 1 to 10 carbon atoms, preferably 1 to 4 carbon atoms, particularly preferably methoxy, an alkenyl group of 2 to 10 carbon atoms, preferably 2 to 4 carbon atoms, an arylalkyl group of 7 to 40 carbon atoms, preferably 7 to 10 carbon atoms, an arylalkenyl group of 8 to 40 carbon atoms, preferably 8 to 12 carbon atoms, or an alkylaryl group of 7 to 40 carbon atoms, preferably 7 to 12 carbon atoms; or $R^{11}$ and $R^{12}$, or $R^{11}$ and $R^{13}$ may form a ring together with carbon atoms to which they are bonded.

$M^2$ is silicon, germanium or tin, preferably silicon or germanium. $R^7$ is preferably $=CR^{11}R^{12}$, $=SiR^{11}R^{12}$, $=GeR^{11}R^{12}$, $-O-$, $-S-$, $=SO$, $=PR^{11}$ or $=P(O)R^{11}$.

$R^8$ and $R^9$ may be the same or different and are each the same as $R^{11}$. m and n may be the same or different and are each 0, 1 or 2, preferably 0 or 1, and m+n is 0, 1 or 2, preferably 0 or 1.

Particularly preferable metallocene compounds satisfying the above conditions are compounds represented by the following formulas (i) to (iii).

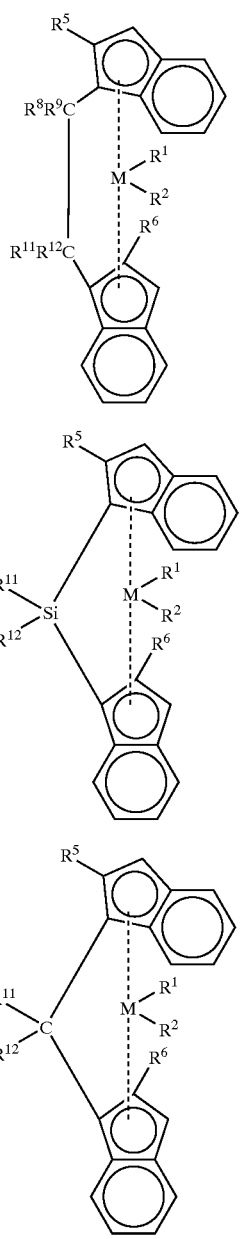

In the formulas (i), (ii) and (iii), $M^1$ is Zr or Hf, $R^1$ and $R^2$ are each methyl or a chlorine atom, $R^5$ and $R^6$ are each methyl, ethyl or trifluoromethyl, and $R^8$, $R^9$, $R^{11}$ and $R^{12}$ have the same meanings as described above.

Of the compounds represented by the formulas (i), (ii) and (iii), particularly preferable compounds are:

rac-ethylene(2-methyl-1-indenyl)-2-zirconium dichloride, rac-dimethylsilylene(2-methyl-1-indenyl)-2-zirconium dichloride, rac-dimethylsilylene(2-methyl-1-indenyl)-2-zirconium dimethyl, rac-ethylene(2-methyl-1-indenyl)-2-zirconium dimethyl, rac-phenyl(methyl)silylene (2-methyl-1-indenyl)-2-zirconium dichloride, rac-diphenylsilylene(2-methyl-1-indenyl)-2-zirconium dichloride, rac-methylethylene(2-methyl-1-indenyl)-2-zirconium dichloride and rac-dimethylsilylene(2-ethyl-1-indenyl)-2-zirconium dichloride.

The metallocene compounds mentioned above can be prepared by methods hitherto known (e.g., see Japanese Patent Laid-Open Publication No. 268307/1992). In the present invention, a transition metal compound (metallocene compound) represented by the following formula (Ic) is also employable.

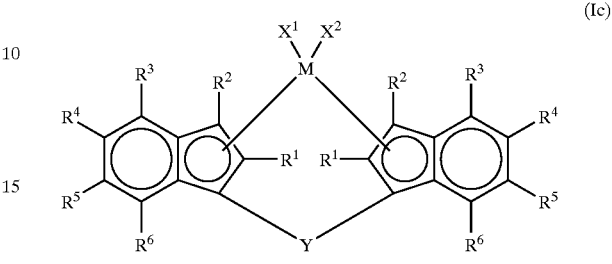

(Ic)

In the formula (Ic), M is a transition metal atom of Group IVB of the periodic table, specifically titanium, zirconium or hafnium. $R^1$ and $R^2$ are each independently a hydrogen atom, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group. Specific examples thereof include halogen atoms, such as fluorine, chlorine, bromine and iodine; hydrocarbon groups of 1 to 20 carbon atoms, e.g., alkyl groups, such as methyl, ethyl, propyl, butyl, hexyl, cyclohexyl, octyl, nonyl, dodecyl, eicosyl, norbornyl and adamantyl, alkenyl groups, such as vinyl, propenyl and cyclohexenyl, arylalkyl groups, such as benzyl, phenylethyl and phenylpropyl, and aryl groups, such as phenyl, tolyl, dimethylphenyl, trimethylphenyl, ethylphenyl, propylphenyl, biphenyl, naphthyl, methylnaphthyl, anthracenyl and phenanthryl; halogenated hydrocarbon groups wherein the above hydrocarbon groups are substituted with halogen atoms; silicon-containing groups, e.g., monohydrocarbon-substituted silyl groups, such as methylsilyl and phenylsilyl, dihydrocarbon-substituted silyl groups, such as dimethylsilyl and diphenylsilyl, trihydrocarbon-substituted silyl groups, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl, silyl ether groups of hydrocarbon-substituted silyls, such as trimethylsilyl ether, silicon-substituted alkyl groups, such as trimethylsilylmethyl, and silicon-substituted aryl groups, such as trimethylsilylphenyl; oxygen-containing groups, e.g., a hydroxyl group, alkoxy groups, such as methoxy, ethoxy, propoxy and butoxy, aryloxy groups, such as phenoxy, methylphenoxy, dimethylphenoxy and naphthoxy, and arylalkoxy groups, such as phenylmethoxy and phenylethoxy; sulfur-containing groups, such as substituent groups wherein oxygen is replaced with sulfur in the above-mentioned oxygen-containing groups; nitrogen-containing groups, e.g., an amino group, alkylamino groups, such as methylamino, dimethylamino, diethylamino, dipropylamino, dibutylamino and dicyclohexylamino, and arylamino groups or alkylarylamino groups, such as phenylamino, diphenylamino, ditolylamino, dinaphthylamino and methylphenylamino; and phosphorus-containing groups, such as dimethylphosphino and diphenylphosphino.

$R^1$ is preferably a hydrocarbon group, particularly preferably a hydrocarbon group of 1 to 3 carbon atoms, such as methyl, ethyl or propyl. $R^2$ is preferably hydrogen or a hydrocarbon group, particularly preferably hydrogen or a hydrocarbon group of 1 to 3 carbon atoms, such as methyl, ethyl or propyl.

$R^3$, $R^4$, $R^5$ and $R^6$ are each independently a hydrogen atom, a halogen atom, a hydrocarbon group of 1 to 20 carbon atom or a halogenated hydrocarbon group of 1 to 20 carbon atoms. They are each preferably hydrogen, a hydrocarbon group or a halogenated hydrocarbon group. At least one combination of $R^3$ and $R^4$, $R^4$ and $R^5$, $R^5$ and $R^6$ may form a monocyclic aromatic ring together with carbon atoms to which they are bonded.

When there are two or more kinds of hydrocarbon groups or halogenated hydrocarbon groups are present, groups other than the groups for forming the aromatic ring may be bonded to each other to form a ring. When $R^6$ is a substituent group other than the aromatic group, the substituent group is preferably a hydrogen atom.

Examples of the halogen atoms, the hydrocarbon groups of 1 to 20 carbon atoms and the halogenated hydrocarbon groups of 1 to 20 carbon atoms include the same groups as previously described with respect to $R^1$ and $R^2$.

Some examples of ligands coordinated to M, which contain a monocyclic aromatic ring formed from at least one combination of $R^3$ and $R^4$, $R^4$ and $R^5$, $R^5$ and $R^6$ bonded to each other, are given below.

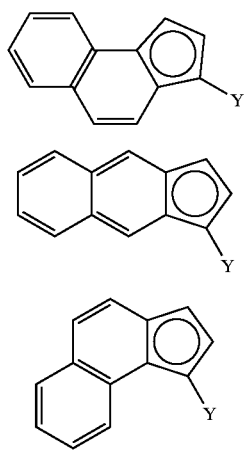

Of these, the ligand represented by the formula (1) is preferable. The aromatic ring-may be substituted with a halogen atom, a hydrocarbon group of 1 to 20 carbon atoms or a halogenated hydrocarbon group of 1 to 20 carbon atoms.

Examples of the halogen atoms, the hydrocarbon groups of 1 to 20 carbon atoms and the halogenated hydrocarbon groups of 1 to 20 carbon atoms for substitution on the aromatic ring include the same groups as previously described with respect to $R^1$ and $R^2$.

$X^1$ and $X^2$ are each independently a hydrogen atom, a halogen atom, a hydrocarbon group of 1 to 20 carbon atom, a halogenated hydrocarbon group of 1 to 20 carbon atoms, an oxygen-containing group or a sulfur-containing group. Examples of such atoms and groups include the same halogen atoms, hydrocarbon groups of 1 to 20 carbon atoms, halogenated hydrocarbon groups of 1 to 20 carbon atoms and oxygen-containing groups as previously described with respect to $R^1$ and $R^2$.

Examples of the sulfur-containing groups include the same groups as previously described with respect to $R^1$ and $R^2$; sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzylsulfinato, p-toluenesulfinato, trimethylbenzenesulfinato and pentafluorobenzenesulfinato.

Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^7$—, —P(R$^7$)—, —P(O)(R$^7$)—, —BR$^7$— or —AlR$^7$— (R$^7$ is a hydrogen atom, a halogen atom, a hydrocarbon group of 1 to 20 carbon atoms or a halogenated hydrocarbon group of 1 to 20 carbon atoms). Specific examples of the above groups include divalent hydrocarbon groups of 1 to 20 carbon atoms, e.g., alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene, and arylalkylene groups, such as diphenylmethylene and diphenyl-1,2-ethylene; halogenated hydrocarbon groups wherein the above-exemplified divalent hydrocarbon groups of 1 to 20 carbon atoms are halogenated, such as chloromethylene; divalent silicon-containing groups, e.g., alkylsilylene, alkylarylsilylene and arylsilylene groups, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)slylene, and alkyldisilylene, alkylaryldisilylene and aryldisilylene groups, such as tetramethyl-1,2-disilylene and tetraphenyl-1,2-disilylene; divalent germanium-containing groups wherein silicon is replaced with germanium in the above-exemplified divalent silicon-containing groups; and divalent tin-containing groups wherein silicon is replaced with tin in the above-exemplified divalent silicon-containing groups. R$^7$ is the same halogen atom, hydrocarbon group of 1 to 20 carbon atoms or halogenated hydrocarbon group of 1 to 20 carbon atoms as previously described with respect to $R^1$ and $R^2$.

Of the above groups, Y is preferably a divalent silicon-containing group, a divalent germanium-containing group or a divalent tin-containing group, more preferably a divalent silicon-containing group, particularly preferably an alkylsilylene group, an alkylarylsilylene group or an arylsilylene group.

Listed below are examples of the transition metal compounds represented by the formula (Ic).

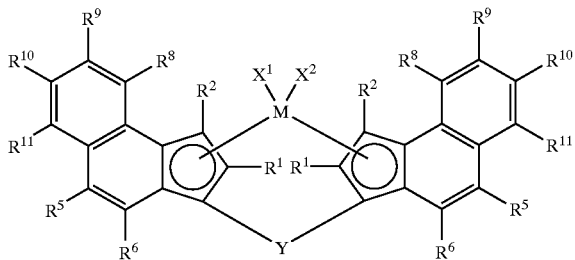

| R¹ | R² | R⁵ | R⁶ | R⁸ | R⁹ | R¹⁰ | R¹¹ | Y | X¹ | X² | M |
|---|---|---|---|---|---|---|---|---|---|---|---|
| H | H | H | H | H | H | H | H | SiMe₂ | Cl | Cl | Zr |
| CH₃ | H | H | H | H | H | H | H | SiMe₂ | Cl | Cl | Zr |
| CH₃ | H | H | H | H | H | H | H | SiMePh | Cl | Cl | Zr |
| CH₃ | H | H | H | H | H | H | H | SiPh₂ | Cl | Cl | Zr |
| CH₃ | H | H | H | H | H | H | H | Si(pMePh)₂ | Cl | Cl | Zr |
| CH₃ | H | H | H | H | H | H | H | Si(pClPh)₂ | Cl | Cl | Zr |
| CH₃ | H | H | H | H | H | H | H | C₂H₄ | Cl | Cl | Zr |
| CH₃ | H | H | H | H | H | H | H | GeMe₂ | Cl | Cl | Zr |
| CH₃ | H | H | H | H | H | H | H | SnMe₂ | Cl | Cl | Zr |
| CH₃ | H | H | H | H | H | H | H | SiMe₂ | Br | Br | Zr |
| CH₃ | H | H | H | H | H | H | H | SiMe₂ | Cl | OSO₂CH₃ | Zr |
| CH₃ | H | H | H | H | H | H | H | SiMe₂ | Cl | SO₂CH₃ | Zr |
| CH₃ | H | H | H | H | H | H | H | SiMe₂ | Cl | Cl | Ti |
| CH₃ | H | H | H | H | H | H | H | SiMe₂ | Cl | Cl | Hf |
| C₂H₅ | H | H | H | H | H | H | H | SiMe₂ | Cl | Cl | Zr |
| nC₃H₇ | H | H | H | H | H | H | H | SiMe₂ | Cl | Cl | Zr |
| C₆H₅ | H | H | H | H | H | H | H | SiMe₂ | Cl | Cl | Zr |
| CH₃ | CH₃ | H | H | H | H | H | H | SiMe₂ | Cl | Cl | Zr |
| CH₃ | CH₃ | H | H | H | H | H | H | SiPh₂ | Cl | Cl | Zr |
| CH₃ | CH₃ | CH₃ | H | H | H | H | H | SiMe₂ | Cl | Cl | Zr |
| CH₃ | H | Cl | H | H | H | H | H | SiMe₂ | Cl | Cl | Zr |
| CH₃ | H | CH₃ | H | H | H | H | H | SiMe₂ | Cl | Cl | Zr |
| CH₃ | H | C₂H₅ | H | H | H | H | H | SiMe₂ | Cl | Cl | Zr |
| CH₃ | H | C₆H₅ | H | H | H | H | H | SiMe₂ | Cl | Cl | Zr |
| CH₃ | H | H | CH₃ | H | H | H | H | SiMe₂ | Cl | Cl | Zr |
| CH₃ | H | CH₃ | CH₃ | H | H | H | H | SiMe₂ | Cl | Cl | Zr |
| CH₃ | H | CH₂*¹ | CH₃ | H | H | H | CH₂*¹ | SiMe₂ | Cl | Cl | Zr |
| CH₃ | H | H | H | H | H | H | C₆H₅ | SiMe₂ | Cl | Cl | Zr |

*¹R⁵ and R¹¹ are bonded to each other to form a five-membered ring.
Me: methyl; Ph: phenyl.

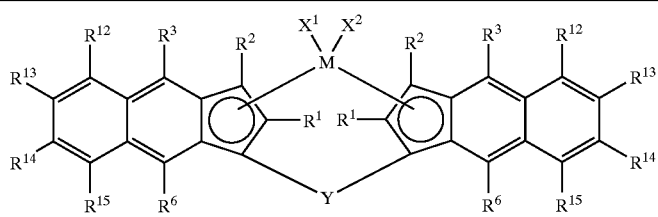

| R¹ | R² | R³ | R⁶ | R¹² | R¹³ | R¹⁴ | R¹⁵ | Y | X¹ | X² | M |
|---|---|---|---|---|---|---|---|---|---|---|---|
| H | H | H | H | H | H | H | H | SiMe₂ | Cl | Cl | Zr |
| CH₃ | H | H | H | H | H | H | H | SiMe₂ | Cl | Cl | Zr |
| CH₃ | H | H | H | H | H | H | H | SiPh₂ | Cl | Cl | Zr |
| CH₃ | CH₃ | H | H | H | H | H | H | SiMe₂ | Cl | Cl | Zr |
| CH₃ | H | CH₃ | H | H | H | H | H | SiMe₂ | Cl | Cl | Zr |
| CH₃ | H | CH₃ | CH₃ | H | H | H | H | SiMe₂ | Cl | Cl | Zr |
| CH₃ | H | CH₂*² | CH₂*² | CH₂*² | H | H | CH₂*² | SiMe₂ | Cl | Cl | Zr |
| CH₃ | H | CH₃ | CH₃ | CH₃ | H | H | CH₃ | SiMe₂ | Cl | Cl | Zr |

*²R³ and R¹², and R⁶ and R¹⁵ are bonded to each other to form a five-memebered ring, respectively.
Me: methyl; Ph: phenyl

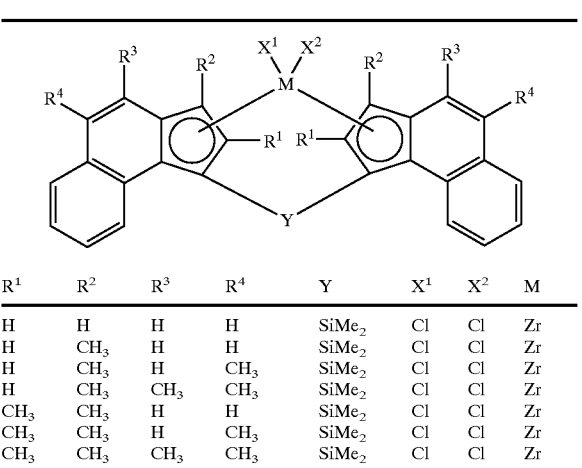

| R¹ | R² | R³ | R⁴ | Y | X¹ | X² | M |
|---|---|---|---|---|---|---|---|
| H | H | H | H | SiMe₂ | Cl | Cl | Zr |
| H | CH₃ | H | H | SiMe₂ | Cl | Cl | Zr |
| H | CH₃ | H | CH₃ | SiMe₂ | Cl | Cl | Zr |
| H | CH₃ | CH₃ | CH₃ | SiMe₂ | Cl | Cl | Zr |
| CH₃ | CH₃ | H | H | SiMe₂ | Cl | Cl | Zr |
| CH₃ | CH₃ | H | CH₃ | SiMe₂ | Cl | Cl | Zr |
| CH₃ | CH₃ | CH₃ | CH₃ | SiMe₂ | Cl | Cl | Zr |

Me: methyl.

In the present invention, transition metal compounds wherein the zirconium metal is replaced with a titanium metal or a hafnium metal in the above compounds are also employable. Although the above transition metal compounds are each generally used as a racemic modification as the olefin polymerization catalyst component, they may be used as R form or S form.

The indene derivative ligand of the transition metal compound can be synthesized by usual organic synthesis through the following reaction route.

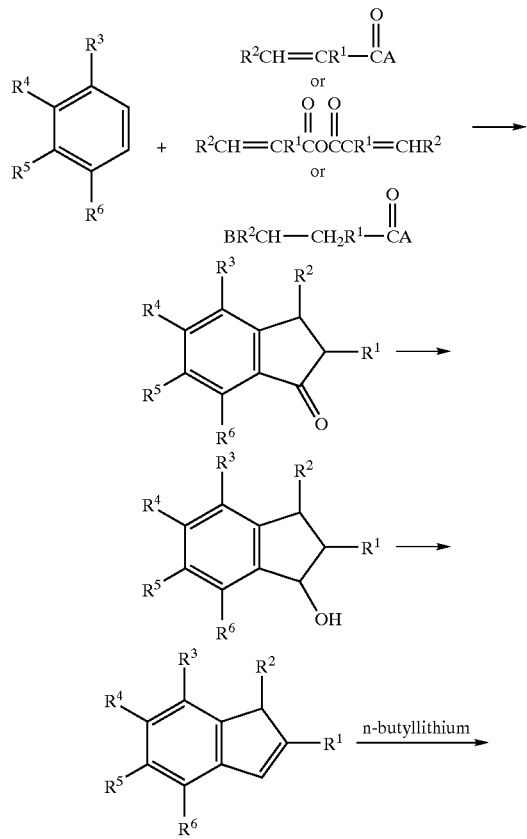

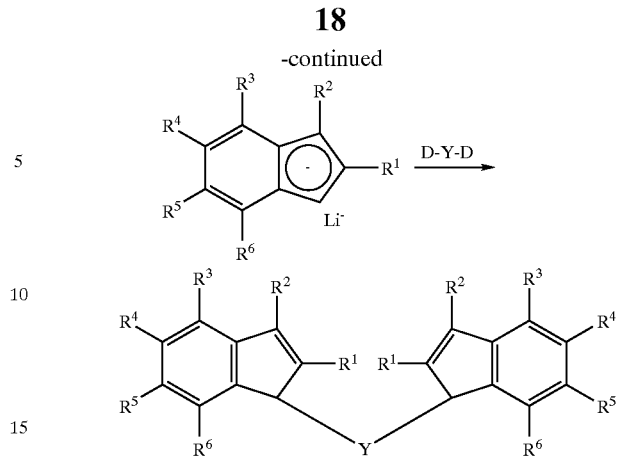

(A, B and D are each a halogen atom.)

The transition metal compound for use in the invention can be synthesized from the indene derivative in accordance with a known process such as a process described in Japanese Patent Laid-Open Publication No. 268307/1992.

In the present invention, a transition metal compound (metallocene compound) represented by the following formula (Id) is also employable.

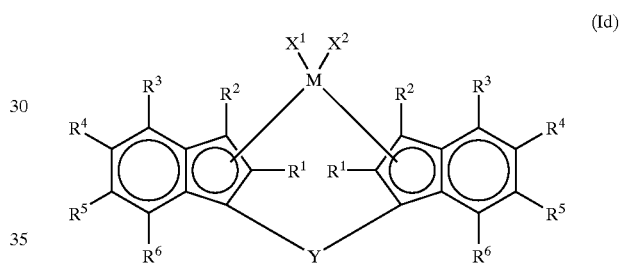

(Id)

In the formula (Id), M, $R^1$, $R^2$, $R^3$, $R^4$, $R^5$ and $R^6$ are the same as those in the formula (Ic). Two groups selected from $R^3$, $R^4$, $R^5$ and $R^6$, one of which is $R^3$, are preferably alkyl groups, and $R^3$ and $R^5$, or $R^3$ and $R^6$ are also preferably alkyl groups. These alkyl groups are preferably secondary or tertiary alkyl groups, and may be substituted with halogen atoms or silicon-containing groups. Examples of the halogen atoms and the silicon-containing groups include the same substituent groups as exemplified with respect to $R^1$ and $R^2$.

Of the groups indicated by $R^3$, $R^4$, $R^5$ and $R^6$, the group other than the alkyl group is preferably a hydrogen atom. Examples of the alkyl groups (hydrocarbon groups of 1 to 20 carbon atoms) include chain alkyl and cyclic alkyl groups, such as methyl, ethyl, n-propyl, i-propyl, n-butyl, i-butyl, sec-butyl, tert-butyl, pentyl, hexyl, cyclohexyl, heptyl, octyl, nonyl, dodecyl, eicosyl, norbornyl and adamantyl; and arylalkyl groups, such as benzyl, phenylethyl, phenylpropyl and tolylmethyl. These alkyl groups may contain a double bond or a triple bond.

Two groups selected from $R^3$, $R^4$, $R^5$ and $R^6$ may be bonded to each other to form a monocyclic or polycyclic ring other than an aromatic ring. Examples of the halogen atoms include the same groups as previously described with respect to $R^1$ and $R^2$.

$X^1$, $X^2$, Y and $R^7$ are the same as those in the formula (Ic).

Examples of the metallocene compounds (transition metal compounds) represented by the formula (Id) are given below:

rac-dimethylsilylene-bis(4,7-dimethyl-1-indenyl) zirconium dichloride, rac-dimethylsilylene-bis(2,4,7- trimethyl-1-indenyl)zirconium dichloride, rac-dimethylsilylene-bis(2,4,6-trimethyl-1-indenyl)zirconium dichloride, rac-dimethylsilylene-bis(2,5,6-trimethyl-1-indenyl)zirconium dichloride, rac-dimethylsilylene-bis(2,4,5,6-tetramethyl-1-indenyl)zirconium dichloride, rac-dimethylsilylene-bis(2,4,5,6,7-pentamethyl-1-indenyl)zirconium dichloride, rac-dimethylsilylene-bis(2-methyl-4-n-propyl-7-methyl-1-indenyl)zirconium dichloride, rac-dimethylsilylene-bis(4-i-propyl-7-methyl-1-indenyl)zirconium dichloride, rac-dimethylsilylene-bis(2-methyl-4-i-propyl-7-methyl-1-indenyl)zirconium dichloride, rac-dimethylsilylene-bis(2-methyl-4-i-propyl-6-methyl-1-indenyl)zirconium dichloride, rac-dimethylsilylene-bis(2-methyl-4-methyl-6-i-propyl-1-indenyl)zirconium dichloride, rac-dimethylsilylene-bis(2-methyl-4-i-propyl-5-methyl-1-indenyl)zirconium dichloride, rac-dimethylsilylene-bis(2-methyl-4,6-di(i-propyl)-1-indenyl)zirconium dichloride, rac-dimethylsilylene-bis(2-methyl-4,6-di(i-propyl)-7-methyl-1-indenyl)zirconium dichloride, rac-dimethylsilylene-bis(2-methyl-4-i-butyl-7-methyl-1-indenyl)zirconium dichloride, rac-dimethylsilylene-bis(2-methyl-4-sec-butyl-7-methyl-1-indenyl)zirconium dichloride, rac-dimethylsilylene-bis(2-methyl-4,6-di sec-butyl)-1-indenyl)zirconium dichloride, rac-dimethylsilylene-bis(2-methyl-4-tert-butyl-7-methyl-1-indenyl)zirconium dichloride, rac-dimethylsilylene-bis(2-methyl-4-cyclohexyl-7-methyl-1-indenyl)zirconium dichloride, rac-dimethylsilylene-bis(2-methyl-4-benzyl-7-methyl-1-indenyl)zirconium dichloride, rac-dimethylsilylene-bis(2-methyl-4-phenylethyl-7-methyl-1-indenyl)zirconium dichloride, rac-dimethylsilylene-bis(2-methyl-4-phenyldichloromethyl-7-methyl-1-indenyl)zirconium dichloride, rac-dimethylsilylene-bis(2-methyl-4-chloromethyl-7-methyl-1-indenyl)zirconium dichloride, rac-dimethylsilylene-bis(2-methyl-4-trimethylsilylmethyl-7-methyl-1-indenyl)zirconium dichloride, rac-dimethylsilylene-bis(2-methyl-4-trimethylsiloxymethyl-7-methyl-1-indenyl)zirconium dichloride, rac-diethylsilylene-bis(2-methyl-4-i-propyl-7-methyl-1-indenyl)zirconium dichloride, rac-di(i-propyl)silylene-bis(2-methyl-4-i-propyl-7-methyl-1-indenyl)zirconium dichloride, rac-di(n-butyl)silylene-bis(2-methyl-4-i-propyl-7-methyl-1-indenyl)zirconium dichloride, rac-di(cyclohexyl)silylene-bis(2-methyl-4-i-propyl-7-methyl-1-indenyl)zirconium dichloride, rac-methylphenylsilylene-bis(2-methyl-4-i-propyl-7-methyl-1-indenyl)zirconium dichloride, rac-diphenylsilylene-bis(2-methyl-4-i-propyl-7-methyl-1-indenyl)zirconium dichloride, rac-diphenylsilylene-bis(2-methyl-4,6-di(i-propyl)-1-indenyl)zirconium dichloride, rac-di(p-tolyl)silylene-bis(2-methyl-4-i-propyl-7-methyl-1-indenyl)zirconium dichloride, rac-di(p-chlorophenyl)silylene-bis(2-methyl-4-i-propyl-7-methyl-1-indenyl)zirconium dichloride, rac-dimethylsilylene-bis(2-methyl-4-i-propyl-7-methyl-1-indenyl)zirconium dibromide, rac-dimethylsilylene-bis(2-methyl-4-i-propyl-7-methyl-1-indenyl)zirconium dimethyl, rac-dimethylsilylene-bis(2-methyl-4-i-propyl-7-methyl-1-indenyl)zirconium methylchloride, rac-dimethylsilylene-bis(2-methyl-4-i-propyl-7-methyl-1-indenyl)zirconium-bis (methanesulfonato), rac-dimethylsilylene-bis(2-methyl-4-i-propyl-7-methyl-1-indenyl)zirconium-bis(p-phenylsulfinato), rac-dimethylsilylene-bis(2-methyl-3-methyl-4-i-propyl-6-methyl-1-indenyl)zirconium dichloride, rac-dimethylsilylene-bis(2-ethyl-4-i-propyl-6-methyl-1-indenyl)zirconium dichloride, and rac-dimethylsilylene-bis(2-phenyl-4-i-propyl-6-methyl-1-indenyl)zirconium dichloride.

In the present invention, transition metal compounds wherein the zirconium metal is replaced with a titanium metal or a hafnium metal in the above compounds are also employable. Although the above transition metal compounds are each generally used as a racemic modification, they may be used as R form or S form.

The indene derivative ligand of the transition metal compound can be synthesized by usual organic synthesis through the aforesaid reaction route. The transition metal compound (metallocene compound) represented by the formula (Id) can be synthesized from the indene derivative in accordance with a known process such as a process described in Japanese Patent Laid-Open Publication No. 268307/1992.

Of the metallocene compounds mentioned above, compounds represented by the following formula (Id-i) or (Ic-i) are particularly preferably used in the invention. The metallocene compounds represented by the formula (Id-i) are part of the metallocene compounds represented by the formula (Id), and the metallocene compounds represented by the formula (Ic-i) are part of the metallocene compounds represented by the formula (Ic).

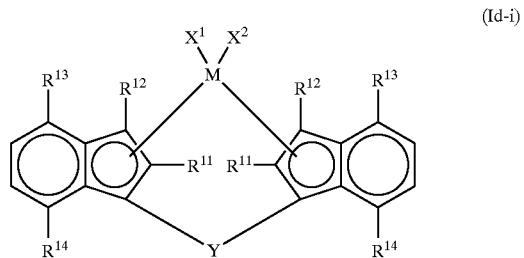

(Id-i)

In the formula (Id-i), M is a transition metal atom of Group IVB of the periodic table, specifically titanium, zirconium or hafnium, particularly preferably zirconium. $R^{11}$ and $R^{12}$ $R^{11}$ and $R^{12}$ are each a hydrogen atom, a halogen atom, a hydrocarbon group of 1 to 20 carbon atoms which may be substituted with halogen, a silicon-containing group, an oxygen-containing group, a sulfur-containing group, a nitrogen-containing group or a phosphorus-containing group. Examples of the hydrocarbon groups of 1 to 20 carbon atoms include alkyl groups, such as methyl, ethyl, propyl, n-butyl, isobutyl, sec-butyl, tert-butyl, pentyl, neopentyl, hexyl, cyclohexyl, octyl, nonyl, dodecyl, eicosyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, α- or β-naphthyl, methylnaphthyl, anthracenyl, phenanthryl, benzylphenyl, pyrenyl, acenaphthyl, phenalenyl, aceanthrylenyl, tetrahydronaphthyl, indanyl and biphenylyl.

These hydrocarbon groups may be substituted with halogen atoms, such as fluorine, chlorine, bromine and iodine; or organosilyl groups, such as trimethylsilyl, triethylsilyl and triphenylsilyl.

Examples of the oxygen-containing groups include a hydroxyl group; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include substituent groups wherein oxygen is replaced with sulfur in the above-mentioned oxygen-containing groups; sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzylsulfinato, p-toluenesulfinato, trimethylbenzenesulfinato and pentafluorobenzenesulfinato.

Examples of the nitrogen-containing groups include an amino group; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino.

Examples of the phosphorus-containing groups include dimethylphosphino and diphenylphosphino. Of the above groups, $R^{11}$ is preferably a hydrocarbon group, particularly preferably a hydrocarbon group of 1 to 3 carbon atoms, such as methyl, ethyl or propyl.

$R^{12}$ is preferably a hydrogen atom or a hydrocarbon group, particularly preferably a hydrogen atom or a hydrocarbon group of 1 to 3 carbon atoms, such as methyl, ethyl or propyl.

$R^{13}$ and $R^{14}$ $R^{13}$ and $R^{14}$ are each such an alkyl group of 1 to 20 carbon atoms as previously exemplified. $R^{13}$ is preferably a secondary or tertiary alkyl group. $R^{14}$ may contain a double bond or a triple bond.

$X^1$ and $X^2$ $X^1$ and $X^2$ may be the same or different and are each a hydrogen atom, a halogen atom, or such a hydrocarbon group of 1 to 20 carbon atoms, halogenated hydrocarbon group of 1 to 20 carbon atoms, oxygen-containing group or sulfur-containing group as previously exemplified. $X^1$ and $X^2$ are each preferably a halogen atom or a hydrocarbon group of 1 to 20 carbon atoms.

Y

Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^{15}$—, —P(R$^{15}$)—, —P(O)(R$^{15}$)—, —BR$^{15}$— or —AlR$^{15}$— (R$^{15}$ is a hydrogen atom, a halogen atom, a hydrocarbon group of 1 to 20 carbon atoms or a halogenated hydrocarbon group of 1 to 20 carbon atoms). Specific examples of the above groups include divalent hydrocarbon groups of 1 to 20 carbon atoms, e.g., alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene, and arylalkylene groups, such as diphenylmethylene and diphenyl-1,2-ethylene; halogenated hydrocarbon groups wherein the above divalent hydrocarbon groups of 1 to 20 carbon atoms are halogenated, such as chloromethylene; divalent silicon-containing groups, e.g., alkylsilylene, alkylarylsilylene and arylsilylene groups, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)silylene, and alkyldisilyl, alkylaryldisilyl and aryldisilyl groups, such as tetramethyl-1,2-disilyl and tetraphenyl-1,2-disilyl; and divalent germanium-containing groups wherein silicon is replaced with germanium in the above-exemplified divalent silicon-containing groups.

$R^{15}$ is the same hydrogen atom, halogen atom, hydrocarbon group of 1 to 20 carbon atoms or halogenated hydrocarbon group of 1 to 20 carbon atoms as previously described. Y is preferably a divalent silicon-containing group or a divalent germanium-containing group, more preferably a divalent silicon-containing group, particularly preferably an alkylsilylene group, an alkylarylsilylene group or an arylsilylene group.

Examples of the metallocene compounds represented by the formula (Id-i) are given below:

rac-dimethylsilylene-bis(2,7-dimethyl-4-ethyl-1-indenyl)zirconium dichloride, rac-dimethylsilylene-bis(2,7-dimethyl-4-n-propyl-1-indenyl)zirconium dichloride, rac-dimethylsilylene-bis(2,7-dimethyl-4-i-propyl-1-indenyl)zirconium dichloride, rac-dimethylsilylene-bis(2,7-dimethyl-4-n-butyl-1-indenyl)zirconium dichloride, rac-dimethylsilylene-bis(2,7-dimethyl-4-sec-butyl-1-indenyl)zirconium dichloride, rac-dimethylsilylene-bis(2,7-dimethyl-4-t-butyl-1-indenyl)zirconium dichloride, rac-dimethylsilylene-bis(2,7-dimethyl-4-n-pentyl-1-indenyl)zirconium dichloride, rac-dimethylsilylene-bis(2,7-dimethyl-4-n-hexyl-1-indenyl)zirconium dichloride, rac-dimethylsilyene-bis(2,7-dimethyl-4-cyclohexyl-1-indenyl)zirconium dichloride, rac-dimethylsilylene-bis(2,7-dimethyl-4-methylcyclohexyl-1-indenyl)zirconium dichloride, rac-dimethylsilylene-bis(2,7-dimethyl-4-phenylethyl-1-indenyl)zirconium dichloride, rac-dimethylsilylene-bis(2,7-dimethyl-4-phenyldichloromethyl-1-indenyl)zirconium dichloride, rac-dimethylsilylene-bis(2,7-dimethyl-4-chloromethyl-1-indenyl)zirconium dichloride, rac-dimethylsilylene-bis(2,7-dimethyl-4-trimethylsilylmethyl-1-indenyl)zirconium dichloride, rac-dimethylsilylene-bis(2,7-dimethyl-4-trimethylsiloxymethyl-1-indenyl)zirconium dichloride, rac-diethylsilylene-bis(2,7-dimethyl-4-i-propyl-1-indenyl)zirconium dichloride, rac-di(i-propyl)silylene-bis(2,7-dimethyl-4-i-propyl-1-indenyl)zirconium dichloride, rac-di(n-butyl)silylene-bis(2,7-dimethyl-4-i-propyl-1-indenyl)zirconium dichloride, rac-di(cyclohexyl)silylene-bis(2,7-dimethyl-4-i-propyl-1-indenyl)zirconium dichloride, rac-methylphenylsilylene-bis(2,7-dimethyl-4-i-propyl-1-indenyl)zirconium dichloride, rac-methylphenylsilylene-bis(2,7-dimethyl-4-t-butyl-1-indenyl)zirconium dichloride, rac-diphenylsilylene-bis(2,7-dimethyl-4-t-butyl-1-indenyl)zirconium dichloride, rac-diphenylsilylene-bis(2,7-dimethyl-4-i-propyl-1-indenyl)zirconium dichloride, rac-diphenylsilylene-bis(2,7-dimethyl-4-ethyl-1-indenyl)zirconium dichloride, rac-di(p-tolyl)silylene-bis(2,7-dimethyl-4-i-propyl-1-indenyl)zirconium dichloride, rac-di(p-chlorophenyl)silylene-bis(2,7-dimethyl-4i-propyl-1-indenyl)zirconium dichloride, rac-dimethylsilylene-bis(2-methyl-4-i-propyl-7-ethyl-1-indenyl)zirconium dibromide, rac-dimethylsilylene-bis(2,3,7-trimethyl-4-ethyl-1-indenyl)zirconium dichloride, rac-dimethylsilylene-bis(2,3,7-trimethyl-4-n-propyl-1-indenyl)zirconium dichloride, rac-dimethylsilylene-bis(2,3,7-trimethyl-4-i-propyl-1-indenyl)zirconium dichloride, rac-dimethylsilylene-bis(2,3,7-trimethyl-4-n-butyl-1-indenyl)zirconium dichloride, rac-dimethylsilylene-bis(2,3,7-trimethyl-4-sec-butyl-1-indenyl)zirconium dichloride, rac-dimethylsilylene-bis(2,3,7-trimethyl-4-t-butyl-1-indenyl)zirconium dichloride, rac-dimethylsilylene-bis(2,3,7-trimethyl-4-n-pentyl-1-indenyl)zirconium dichloride, rac-dimethylsilylene-bis(2,3,7-trimethyl-4-n-hexyl-1-indenyl)zirconium dichloride, rac-dimethylsilylene-bis(2,3,7-trimethyl-4-cyclohexyl-1- indenyl)zirconium dichloride, rac-dimethylsilylene-bis(2,3,7-trimethyl-4-methylcyclohexyl-1-indenyl)zirconium dichloride, rac-dimethylsilylene-bis(2,3,7-trimethyl-4-trimethylsilylmethyl-1-indenyl)zirconium dichloride, rac-dimethylsilylene-bis(2,3,7-trimethyl-4-trimethylsiloxymethyl-1-indenyl)zirconium dichloride, rac-dimethylsilylene-bis(2,3,7-trimethyl-4-phenylethyl-1-indenyl)zirconium dichloride, rac-dimethylsilylene-bis(2,3,7-trimethyl-4-phenyldichloromethyl-1-indenyl)zirconium dichloride, rac-dimethylsilyene-bis(2,3,7-trimethyl-4-chloromethyl-1-indenyl)zirconium dichloride, rac-diethylsilylene-bis(2,3,7-trimethyl-4-i-propyl-1-indenyl)zirconium dichloride, rac-di(i-propyl)silylene-bis(2,3,7-trimethyl-4-i-propyl-1-indenyl)zirconium dichloride, rac-di(n-butyl) silylene-bis(2,3,7-trimethyl-4-i-propyl-1-indenyl)zirconium dichloride, rac-di(cyclohexyl)silylene-bis(2,3,7-trimethyl-4-i-propyl-1-indenyl)zirconium dichloride, rac-methylphenylsilylene-bis(2,3,7-trimethyl-4-i-propyl-1-indenyl)zirconium dichloride, rac-methylphenylsilylene-bis(2,3,7-trimethyl-4-t-butyl-1-indenyl)zirconium dichloride, rac-diphenylsilylene-bis(2,3,7-trimethyl-4-t-butyl-1-indenyl)zirconium dichloride, rac-diphenylsilylene-bis(2,3,7-trimethyl-4-i-propyl-1-indenyl)zirconium dichloride, rac-diphenylsilylene-bis(2,3,7-trimethyl-4-ethyl-1-indenyl)zirconium dichloride, rac-di(p-tolyl)silylene-bis(2,3,7-trimethyl-4-i-propyl-1-indenyl)zirconium dichloride, rac-di(p-chlorophenyl) silylene-bis(2,3,7-trimethyl-4-i-propyl-1-indenyl)zirconium dichloride, rac-dimethylsilylene-bis(2-methyl-4-i-propyl-7-methyl-1-indenyl)zirconium dimethyl, rac-dimethylsilylene-bis(2-methyl-4-i-propyl-7-methyl-1-indenyl)zirconium methylchloride, rac-dimethylsilylene-bis(2-methyl-4-i-propyl-7-methyl-1-indenyl)zirconium-bis(methanesulfonato), rac-dimethylsilylene-bis(2-methyl-4-i-propyl-7-methyl-1-indenyl)zirconium-bis(p-phenylsulfinato), rac-dimethylsilylene-bis(2-methyl-3-methyl-4-i-propyl-7-methyl-1-indenyl)zirconium dichloride, rac-dimethylsilylene-bis(2-ethyl-4-i-propyl-7-methyl-1-indenyl)zirconium dichloride, rac-dimethylsilylene-bis(2-phenyl-4-i-propyl-7-methyl-1-indenyl)zirconium dichloride, rac-dimethylsilylene-bis(2-methyl-4-i-propyl-7-methyl-1-indenyl)titanium dichloride and rac-dimethylsilylene-bis(2-methyl-4-i-propyl-7-methyl-1-indenyl)hafnium dichloride Of these, compounds having a branched alkyl group such as i-propyl, sec-butyl or tert-butyl at the 4-position are particularly preferable. In the present invention, the above transition metal compounds are each generally used as a racemic modification as the olefin polymerization catalyst component, but they may be used as R form or S form.

The transition metal compound mentioned above can be synthesized from the indene derivative in accordance with a known prodess such as a process described in Japanese Patent Laid-Open Publication No. 268307/1992. The compound represented by the following formula (Ic-i) that is preferably used in the invention is described in EP No. 549,900 and Canadian Patent No. 2,084,017.

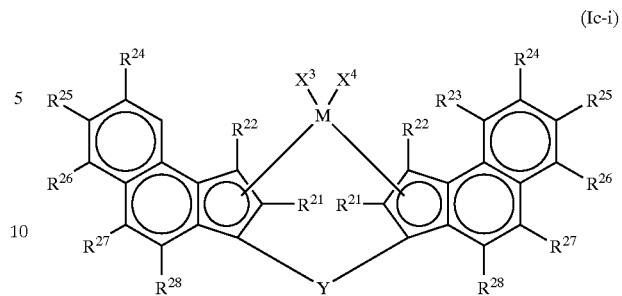

(Ic-i)

In the formula (Ic-i), M is a transition metal atom of Group IVB of the periodic table, specifically titanium, zirconium or hafnium, particularly preferably zirconium. Each $R^{21}$ is the same or different and is a hydrogen atom, a halogen atom, preferably fluorine or chlorine, an alkyl group of 1 to 10 carbon atoms, preferably 1 to 4 carbon atoms, which may be halogenated, an aryl group of 6 to 10 carbon atoms, preferably 6 to 8 carbon atoms, $-NR_2$ group, $-SR$ group, $-OSiR_3$ group, $-SiR_3$ group or $-PR_2$ group (R is a halogen atom, preferably chlorine, an alkyl group of 1 to 10 carbon atoms, preferably 1 to 3 carbon atoms, or an aryl group of 6 to 10 carbon atoms, preferably 6 to 8 carbon atoms).

$R^{22}$ to $R^{28}$ may be the same of different and are each the same atom or group as previously described with respect to $R^{21}$, and at least two neighboring groups of $R^{22}$ to $R^{28}$ may form an aromatic ring or an aliphatic ring together with atoms to which they are bonded.

$X^3$ and $X^4$ my be the same or different and are each a hydrogen atom, a halogen atom, OH group, an alkyl group of 1 to 10 carbon atoms, preferably 1 to 3 carbon atoms, an alkoxy group of 1 to 10 carbon atoms, preferably 1 to 3 carbon atoms, an aryl group of 6 to 10 carbon atoms, preferably 6 to 8 carbon atoms, an aryloxy group of 6 to 10 carbon atoms, preferably 6 to 8 carbon atoms, an alkenyl group of 2 to 10 carbon atoms, preferably 2 to 4 carbon atoms, an arylalkyl group of 7 to 40 carbon atoms, preferably 7 to 10 carbon atom, an alkylaryl group of 7 to 40 carbon atoms, preferably 7 to 12 carbon atoms, or an arylalkenyl group of 8 to 40 carbon atoms, preferably 8 to 12 carbon atoms.

Z is

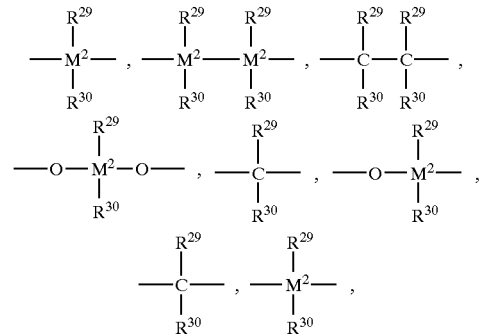

$=BR^{29}$, $=AlR^{29}$, $-Ge-$, $-Sn-$, $-O-$, $-S-$, $=SO$, $=SO_2$, $=NR^{29}$, $=CO$, $-PR^{29}$ or $=P(O)R^{29}$.

$R^{29}$ and $R^{30}$ may be the same or different and are each a hydrogen atom, a halogen atom, an alkyl group of 1 to 10 carbon atoms, preferably 1 to 4 carbon atoms, particularly preferably methyl, a fluoroalkyl group of 1 to 10 carbon atom, preferably $CF_3$ group, an aryl group of 6 to 10 carbon atoms, preferably 6 to 8 carbon atom, a fluoroaryl group of 6 to 10 carbon atoms, preferably pentafluorophenyl, an alkoxy group of 1 to 10 carbon atoms, preferably 1 to 4 carbon atoms, particularly preferably methoxy, an alkenyl group of 2 to 10 carbon atoms, preferably 2 to 4 carbon atoms, an arylalkyl group of 7 to 40 carbon atoms, preferably 7 to 10 carbon atoms, an arylalkenyl group of 8 to 40 carbon atoms, preferably 8 to 12 carbon atoms, or an alkylaryl group of 7 to 40 carbon atoms, preferably 7 to 12 carbon atoms.

$R^{29}$ and $R^{30}$ may form a ring together with atoms to which they are bonded. $M^2$ is silicon, germanium or tin.

The aforesaid alkyl group is a straight chain or branched alkyl group, and the halogen (for halogenation) is a fluorine atom, a chlorine atom, a bromine atom or an iodine atom, particularly preferably a fluorine atom or a chlorine atom.

Of the compounds represented by the formula (Ic-i), preferable are compounds wherein M is zirconium or hafnium, each $R^{21}$ is the same and is an alkyl group of 1 to 4 carbon atoms, $R^{22}$ to $R^{28}$ may be the same or different and are each a hydrogen atom or an alkyl group of 1 to 4 carbon atoms, $X^3$ and $X^4$ may be the same or different and are each an alkyl group of 1 to 3 carbon atoms or a halogen atom, and Z is

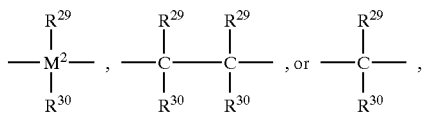

wherein $M^2$ is silicon, $R^{29}$ and $R^{30}$ may be the same or different and are each an alkyl group of 1 to 4 carbon atoms or an aryl group of 6 to 10 carbon atoms. More preferable are compounds wherein the substituent groups $R^{22}$ and $R^{28}$ are each a hydrogen atom, and $R^{23}$ to $R^{27}$ are each an alkyl group of 1 to 4 carbon atoms or a hydrogen atom.

Also preferable are compounds wherein M is zirconium, each $R^{21}$ is the same and is an alkyl group of 1 to 4 carbon atoms, $R^{22}$ and $R^{28}$ are each a hydrogen atom, $R^{23}$ to $R^{27}$ may be the same or different and are each an alkyl group of 1 to 4 carbon atoms or a hydrogen atom, $X^3$ and $X^4$ are each a chlorine atom, and Z is

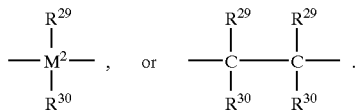

wherein $M^2$ is silicon, $R^{29}$ and $R^{30}$ may be the same or different and are each an alkyl group of 1 to 4 carbon atoms or an aryl group of 6 to 10 carbon atoms. Particularly preferable are compounds wherein M is zirconium, $R^{21}$ is methyl, $R^{22}$ to $R^{28}$ are each a hydrogen atom, $X^3$ and $X^4$ are each a chlorine atom, Z is

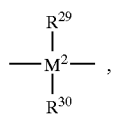

wherein $M^2$ is silicon, and $R^{29}$ and $R^{30}$ may be the same or different and are each methyl or phenyl.

Some examples of the metallocene compounds represented by the formula (Ic-i) are given below:

rac-dimethylsilylene-bis{1-(2-methyl-4,5-benzoindenyl)}zirconium dichloride, rac-dimethylsilylene-bis{1-(2-methyl-4,5-acenaphthocyclopentadienyl)}zirconium dichloride, rac-dimethylsilylene-bis{1-(2,3,6-trimethyl-4,5-benzoindenyl)}zirconium dichloride, rac-methylphenylsilylene-bis{1-(2-methyl-4,5-benzoindenyl)}zirconium dichloride, rac-methylphenylsilylene-bis{1-(2-methyl-4,5-acenaphthocyclopentadienyl)}zirconium dichloride, rac-methylphenylsilylene-bis{1-(4,5-benzoindenyl)}zirconium dichloride, rac-methylphenylsilylene-bis{1-(2,6-dimethyl-4,5-benzoindenyl)}zirconium dichloride and rac-metylphenylsilylene-bis{1-(2,3,6-trimethyl-4,5-benzoindenyl)}zirconium dichloride.

Compounds wherein zirconium is replaced with titanium or hafnium in the above compounds are also employable. In the present invention, the metallocene compounds represented by the formula (Id-i) or (Ic-i) are each generally used as a racemic modification as the catalyst component, but they may be used as R form or S form.

The metallocene compounds mentioned above may be used in combination of two or more kinds.

The metallocene compound (A) for use in the preparation of the long-chain branched ethylene/α-olefin random copolymer that is preferably used in the invention is, for example, a compound represented by the following formula (II).

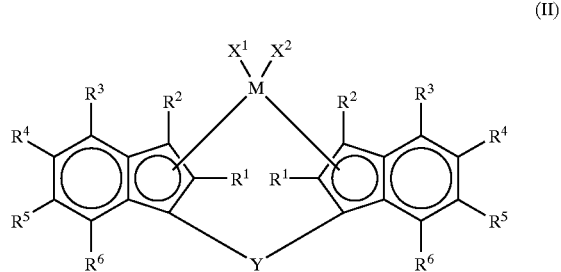

(II)

In the above formula, M is a transition metal atom of Group IVB of the periodic table, specifically titanium, zirconium or hafnium, particularly preferably zirconium.

Substituent group $R^1$ $R^1$ is a hydrocarbon group of 1 to 6 carbon atoms, and examples thereof include alkyl groups, such as methyl, ethyl, n-propyl, isopropyl, n-butyl, isobutyl, sec-butyl, tert-butyl, n-pentyl, neopentyl, n-hexyl and cyclohexyl, and alkenyl groups, such as vinyl and propenyl.

Of these, preferable are primary alkyl groups bonded to the indenyl group; more preferable are alkyl groups of 1 to 4 carbon atoms; and particularly preferable are methyl and ethyl.

Substituent Groups $R^2$, $R^4$, $R^5$ and $R^6$ $R^2$, $R^4$, $R^5$ and $R^6$ may be the same or different and are each a hydrogen atom, a halogen atom or the same hydrocarbon group of 1 to 6 carbon atoms as described above with respect to $R^1$. The halogen atom is fluorine, chlorine, bromine or iodine.

Substituent Group $R^3$ $R^3$ is an aryl group of 6 to 16 carbon atoms. This aryl group may be substituted with a halogen atom, a hydrocarbon group of 1 to 20 carbon atoms or an organosilyl group.

Examples of the aryl groups include phenyl, α-naphthyl, β-naphthyl, anthracenyl, phenanthryl, pyrenyl, acenaphthyl, phenalenyl, aceanthrylenyl, tetrahydronaphthyl, indanyl and biphenylyl. Of these, preferable are phenyl, naphthyl, anthracenyl and phenanthryl.

Examples of the hydrocarbon groups of 1 to 20 carbon atoms, which are substituent groups on the aryl groups, include alkyl groups, such as methyl, ethyl, propyl, butyl, hexyl, cyclohexyl, octyl, nonyl, dodecyl, eicosyl, norbornyl and adamantyl; alkenyl groups, such as vinyl, propenyl and cyclohexenyl; arylalkyl groups, such as benzyl, phenylethyl and phenylpropyl; and aryl groups, such as the above-exemplified aryl groups, tolyl, dimethylphenyl, trimethylphenyl, ethylphenyl, propylphenyl, methylnaphthyl and benzylphenyl.

Examples of the organosilyl groups include trimethylsilyl, triethylsilyl and triphenylsilyl.

$X^1$ and $X^2$ $X^1$ and $X^2$, are each a hydrogen atom, a halogen atom or a hydrocarbon group of 1 to 20 carbon atoms which may be substituted with halogen, an oxygen-containing group or a sulfur-containing group. Examples of the halogen atoms and the hydrocarbon groups include the same halogen atoms and hydrocarbon groups as previously described.

Examples of the oxygen-containing groups include a hydroxyl group; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include substituent groups wherein oxygen is replaced with sulfur in the above-mentioned oxygen-containing groups; sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzylsulfinato, p-toluenesulfinato, trimethylbenzenesulfinato and pentafluorobenzenesulfinato.

$X^1$ and $X^2$ are each preferably a halogen atom or a hydrocarbon group of 1 to 20 carbon atoms.

X

Y is a divalent hydrocarbon group of 1 to 20 carbon atoms, a divalent halogenated hydrocarbon group of 1 to 20 carbon atoms, a divalent silicon-containing group, a divalent germanium-containing group, —O—, —CO—, —S—, —SO—, —SO$_2$—, —NR$^7$—, —P(R$^7$)—, —P(O)(R$^7$)—, —BR$^7$— or —AlR$^7$— ($R^7$ is a hydrogen atom, a halogen atom, a hydrocarbon group of 1 to 20 carbon atoms or a halogenated hydrocarbon group of 1 to 20 carbon atoms). Specific examples of the above groups include divalent hydrocarbon groups of 1 to 20 carbon atoms, e.g., alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene, and arylalkylene groups, such as diphenylmethylene and diphenyl-1,2-ethylene; halogenated hydrocarbon groups wherein the above-exemplified divalent hydrocarbon groups of 1 to 20 carbon atoms are halogenated, such as chloromethylene; divalent silicon-containing groups, e.g., alkylsilylene, alkylarylsilylene and arylsilylene groups, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)silylene, and alkyldisilyl, alkylaryldisilyl and aryldisilyl groups, such as tetramethyl-1,2-disilyl and tetraphenyl-1,2-disilyl; and divalent germanium-containing groups wherein silicon is replaced with germanium in the above-exemplified divalent silicon-containing groups.

$R^7$ is the same halogen atom, hydrocarbon group of 1 to 20 carbon atoms or halogenated hydrocarbon group of 1 to 20 carbon atoms as previously described. Y is preferably a divalent silicon-containing group or a divalent germanium-containing group, more preferably a divalent silicon-containing group, particularly preferably an alkylsilylene group, an alkylarylsilylene group or an arylsilylene group.

Examples of the metallocene compounds represented by the formula (II) are given below:

rac-dimethylsilylene-bis(4-phenyl-1-indenyl)zirconium dichloride, rac-dimethylsilylene-bis(1-(2-methyl-4-phenylindenyl))zirconium dichloride, rac-dimethylsilylene-bis(2-methyl-4-(α-naphthyl)-1-indenyl)zirconilum dichloride, rac-dimethylsilylene-bis(2-methyl-4-(β-naphthyl)-1-indenyl)zirconium dichloride, rac-dimethylsilylene-bis(2-methyl-4-(1-anthracenyl)-1-indenyl) zirconium dichloride, rac-dimethylsilylene-bis(2-methyl-4-(2-anthracenyl)-1-indenyl)zirconium dichloride, rac-dimethylsilylene-bis(2-methyl-4-(9-anthracenyl)-1-indenyl) zirconium dichloride, rac-dimethylsilylene-bis(2-methyl-4-(9-phenanthryl)-1-indenyl)zirconium dichloride, rac-dimethylsilylene-bis(2-methyl-4-(p-fluorophenyl)-1-indenyl)zirconium dichloride, rac-dimethylsilylene-bis(2-methyl-4-(pentafluorophenyl)-1-indenyl)zirconium dichloride, rac-dimethylsilylene-bis(2-methyl-4-(p-chlorophenyl)-1-indenyl)zirconium dichloride, rac-dimethylsilylene-bis(2-methyl-4-(m-chlorophenyl)-1-indenyl)zirconium dichloride, rac-dimethylsilylene-bis(2-methyl-4-(o-chlorophenyl)-1-indenyl)zirconium dichloride, rac-dimethylsilylene-bis(2-methyl-4-(o,p-dichlorophenyl) phenyl-1-indenyl)zirconium dichloride, rac-dimethylsilylene-bis(2-methyl-4-(p-bromophenyl)-1-indenyl)zirconium dichloride, rac-dimethylsilylene-bis(2-methyl-4-(p-tolyl)-1-indenyl)zirconium dichloride, rac-dimethylsilylene-bis(2-methyl-4-(m-tolyl)-1-indenyl) zirconium dichloride, rac-dimethylsilylene-bis(2-methyl-4-(o-tolyl)-1-indenyl)zirconium dichloride, rac-dimethylsilylene-bis(2-methyl-4-(o,o'-dimethylphenyl)-1-indenyl)zirconium dichloride, rac-dimethylsilylene-bis(2-methyl-4-(p-ethylphenyl)-1-indenyl)zirconium dichloride, rac-dimethylsilylene-bis(2-methyl-4-(p,i-propylphenyl)-1-indenyl)zirconium dichloride, rac-dimethylsilylene-bis(2-methyl-4-(p-benzylphenyl)-1-indenyl)zirconium dichloride, rac-dimethylsilylene-bis(2-methyl-4-(p-biphenyl)-1-indenyl)zirconium dichloride, rac-dimethylsilylene-bis(2-methyl-4-(m-biphenyl)-1-indenyl)zirconium dichloride, rac-dimethylsilylene-bis(2-methyl-4-p-trimethylsilylenephenyl)-1-indenyl)zirconium dichloride, rac-dimethylsilylene-bis(2-methyl-4-(m-trimethylsilylenephenyl)-1-indenyl)zirconium dichloride, rac-dimethylsilylene-bis(2-phenyl-4-phenyl-1-indenyl) zirconium dichloride, rac-diethylsilylene-bis(2-methyl-4-phenyl-1-indenyl)zirconium dichloride, rac-di(i-propyl) silylene-bis(2-methyl-4-phenyl-1-indenyl)zirconium dichloride, rac-di(n-butyl)silylene-bis(2-methyl-4-phenyl-1-indenyl)zirconium dichloride, rac-dicyclohexylsilylene-bis (2-methyl-4-phenyl-1-indenyl)zirconium dichloride, rac-methylphenylsilylene-bis(2-methyl-4-phenyl-1-indenyl) zirconium dichloride, rac-diphenylsilylene-bis(2-methyl-4-phenyl-1-indenyl)zirconium dichloride, rac-di(p-tolyl) silylene-bis(2-methyl-4-phenyl-1-indenyl)zirconium dichloride, rac-di(p-chlorophenyl)silylene-bis(2-methyl-4-phenyl-1-indenyl)zirconium dichloride, rac-methylene-bis (2-methyl-4-phenyl-1-indenyl)zirconium dichloride, rac-ethylene-bis(2-methyl-4-phenyl-1-indenyl)zirconium dichloride, rac-dimethylgermylene-bis(2-methyl-4-phenyl-1-indenyl)zirconium dichloride, rac-dimethylstannylene-bis (2-methyl-4-phenyl-1-indenyl)zirconium dichloride, rac-dimethylsilylene-bis(2-methyl-4-phenyl-1-indenyl) zirconium dibromide, rac-dimethylsilylene-bis(2-methyl-4-phenyl-1-indenyl)zirconium dimethyl, racdimethylsilylene-bis(2-methyl-4-phenyl-1-indenyl) zirconium methylchloride, rac-dimethylsilylene-bis(2-methyl-4-phenyl-1-indenyl)zirconium chloride SO₂Me, rac-dimethylsilylene-bis(2-methyl-4-phenyl-1-indenyl) zirconium chloride OSO₂Me, rac-dimethylsilylene-bis{1-(2-ethyl-4-phenylindenyl)}zirconium dichloride, rac-dimethylsilylene-bis{1-(2-ethyl-4-(α-naphthyl)indenyl)} zirconium dichloride, rac-dimethylsilylene-bis{1-(2-ethyl-4-(β-naphthyl)indenyl)}zirconium dichloride, rac-dimethylsilylene-bis{1-(2-ethyl-4-(2-methyl-1-naphthyl) indenyl)}zirconium dichloride, rac-dimethylsilylene-bis{-(2-ethyl-4-(5-acenaphthyl)indenyl)}zirconium dichloride, rac-dimethylsilylene-bis{-(2-ethyl-4-(9-anthracenyl) indenyl)}zirconium dichloride, rac-dimethylsilylene-bis{-(2-ethyl-4-(9-phenanthryl)indenyl)}zirconium dichloride, rac-dimethylsilylene-bis{1-(2-ethyl-4-(o-methylphenyl) indenyl)}zirconium dichloride, rac-dimethylsilylene-bis{1-(2-ethyl-4-(m-methylphenyl)indenyl)}zirconium dichloride, rac-dimethylsilylene-bis{1-(2-ethyl-4-(p-methylphenyl) indenyl)}zirconium dichloride, rac-dimethylsilylene-bis{1-(2-ethyl-4-(2,3-dimethylphenyl)indenyl)}zirconium dichloride, rac-dimethylsilylene-bis{1-(2-ethyl-4-(2,4-dimethylphenyl)indenyl)}zirconium dichloride, rac-dimethylsilylene-bis{-(2-ethyl-4-(2,5-dimethylphenyl) indenyl)}zirconium dichloride, rac-dimethylsilylene-bis{1-(2-ethyl-4-(2,4,6-trimethylphenyl)indenyl)}zirconium dichloride, rac-dimethylsilylene-bis{1-(2-ethyl-4-(o-chlorophenyl)indenyl)}zirconium dichloride, rac-dimethylsilylene-bis{-(2-ethyl-4-(m-chlorophenyl) indenyl)} zirconium dichloride, rac-dimethylsilylene-bis{1-(2-ethyl-4-(p-chlorophenyl)indenyl)}zirconium dichloride, rac-dimethylsilylene-bis{1-(2-ethyl-4-(2,3-dichlorophenyl) indenyl)}zirconium dichloride, rac-dimethylsilylene-bis{1-(2-ethyl-4-(2,6-dichlorophenyl)indenyl)}zirconium dichloride, rac-dimethylsilylene-bis{1-(2-ethyl-4-(3,5-dichlorophenyl)indenyl)}zirconium dichloride, rac-dimethylsilyene-bis{1-(2-ethyl-4-(2-bromophenyl) indenyl)} zirconium dichloride, rac-dimethylsilylene-bis{1-(2-ethyl-4-(3-bromophenyl)indenyl)}zirconium dichloride, rac-dimethylsilylene-bis{1-(2-ethyl-4-(4-bromophenyl) indenyl)} zirconium dichloride, rac-dimethylsilylene-bis{1-(2-ethyl-4-(4-biphenylyl)indenyl)}zirconium dichloride, rac-dimethylsilylene-bis{1-(2-ethyl-4-(4-trimethylphenyl)indenyl)}zirconium dichloride, rac-dimethylsilylene-bis{1-(2-n-propyl-4-phenylindenyl)} zirconium dichloride, rac-dimethylsilylene-bis{1-(2-n-propyl-4-(α-naphthyl)indenyl)} zirconium dichloride, rac-dimethylsilylene-bis{1-(2-n-propyl-4-(β-naphthyl) indenyl)} zirconium dichloride, rac-dimethylsilylene-bis{1-(2-n-propyl-4-(2-methyl-1-naphthyl)indenyl)}zirconium dichloride, rac-dimethylsilylene-bis{-(2-n-propyl-4-(5-acenaphthyl)indenyl)}zirconium dichloride, rac-dimethylsilylene-bis{1-(2-n-propyl-4-(9-anthracenyl) indenyl)}zirconium dichloride, rac-dimethylsilylene-bis{1-(2-n-propyl-4-(9-phenanthryl)indenyl)}zirconium dichloride, rac-dimethylsilylene-bis{1-(2-i-propyl-4-phenylindenyl)} zirconium dichloride, rac-dimethylsilylene-bis{1-(2-i-propyl-4-(α-naphthyl)indenyl)} zirconium dichloride, rac-dimethylsilylene-bis{-(2-i-propyl-4-(β-naphthyl)indenyl)}zirconium dichloride, rac-dimethylsilylene-bis{1-(2-i-propyl-4-(8-methyl-9-naphthyl) indenyl)}zirconium dichloride, rac-dimethylsilylene-bis{1-(2-i-propyl-4-(5-acenaphthyl)indenyl)}zirconium dichloride, rac-dimethylsilylene-bis{1-(2-i-propyl-4-(9-anthracenyl)indenyl)}zirconium dichloride, rac-dimethylsilylene-bis{1-(2-i-propyl-4-(9-phenanthryl) indenyl)}zirconium dichloride, rac-dimethylsilylene-bis{1-(2-s-butyl-4-phenylindenyl)}zirconium dichloride, rac-dimethylsilylene-bis{1-(2-s-butyl-4-(α-naphthyl)indenyl)} zirconium dichloride, rac-dimethylsilylene-bis{1-(2-s-butyl-4-(β-naphthyl)indenyl)}zirconium dichloride, rac-dimethylsilylene-bis{1-(2-s-butyl-4-(2-methyl-1-naphthyl) indenyl)}zirconium dichloride, rac-dimethylsilylene-bis{1-(2-s-butyl-4-(5-acenaphthyl)indenyl)}zirconium dichloride, rac-dimethylsilylene-bis{1-(2-s-butyl-4-(9-anthracenyl) indenyl)}zirconium dichloride, rac-dimethylsilylene-bis{-(2-s-butyl-4-(9-phenanthryl)indenyl)}zirconium dichloride, rac-dimethylsilylene-bis{1-(2-n-pentyl-4-phenylindenyl)} zirconium dichloride, rac-dimethylsilylene-bis{1-(2-n-pentyl-4-α-naphthyl)indenyl)}zirconium dichloride, rac-dimethylsilylene-bis{1-(2-n-butyl-4-phenylindenyl)} zirconium dichloride, rac-dimethylsilylene-bis{-(2-n-butyl-4-β-naphthyl)indenyl)}zirconium dichloride, rac-dimethylsilylene-bis{1-(2-n-butyl-4-(β-naphthyl)indenyl)} zirconium dichloride, rac-dimethylsilylene-bis{1-(2-n-butyl-4-(2-methyl-1-naphthyl)indenyl)}zirconium dichloride, rac-dimethylsilylene-bis{-(2-n-butyl-4-(5-acenaphthyl)indenyl)}zirconium dichloride, rac-dimethylsilylene-bis{-(2-n-butyl-4-(9-anthracenyl) indenyl)} zirconium dichloride, rac-dimethylsilylene-bis{-(2-n-butyl-4-(9-phenanthryl)indenyl)}zirconium dichloride, rac-dimethylsilylene-bis{-(2-i-butyl-4-phenylindenyl)} zirconium dichloride, rac-dimethylsilylene-bis{1-(2-i-butyl-4-(α-naphthyl)indenyl)} zirconium dichloride, rac-dimethylsilylene-bis{1-(2-i-butyl-4-(β-naphthyl)indenyl)} zirconium dichloride, rac-dimethylsilylene-bis{1-(2-i-butyl-4-(2-methyl-1-naphthyl)indenyl)}zirconium dichloride, rac-dimethylsilylene-bis{1-(2-i-butyl-4-(5-acenaphthyl) indenyl)}zirconium dichloride, rac-dimethylsilylene-bis{1-(2-i-butyl-4-(9-anthracenyl)indenyl)}zirconium dichloride, rac-dimethylsilylene-bis{1-(2-i-butyl-4-(9-phenanthryl) indenyl)}zirconium dichloride, rac-dimethylsilylene-bis{1-(2-neopentyl-4-phenylindenyl)}zirconium dichloride, rac-dimethylsilylene-bis{1-(2-neopentyi-4-α-naphthyl) indenyl)} zirconium dichloride, rac-dimethylsilylene-bis{1-(2-n-hexyl-4-phenylindenyl)}zirconium dichloride, rac-dimethylsilylene-bis{1-(2-n-hexyl-4-(α-naphthyl)indenyl)} zirconium dichloride, rac-methylphenylsilylene-bis{-(2-ethyl-4-phenylindenyl)}zirconium dichloride, rac-methylphenylsilylene-bis{1-(2-ethyl-4-α-naphthyl) indenyl)} zirconium dichloride, rac-methylphenylsilylene-bis{-(2-ethyl-4-(9-anthracenyl)indenyl)}zirconium dichloride, rac-methylphenylsilylene-bis{1-(2-ethyl-4-(9-phenanthryl)indenyl)}zirconium dichloride, rac-diphenylsilylene-bis({1-(2-ethyl-4-phenylindenyl)} zirconium dichloride, rac-diphenylsilylene-bis({1-(2-ethyl-4-(α-naphthyl)indenyl)}zirconium dichloride, rac-diphenylsilylene-bis{1-(2-ethyl-4-(9-anthracenyl)indenyl)} zirconium dichloride, rac-diphenylsilylene-bis{1-(2-ethyl-4-(9-phenanthryl)indenyl)}zirconium dichloride, rac-diphenylsilylene-bis{1-(2-ethyl-4-(4-biphenylyl)indenyl)} zirconium dichloride, rac-methylene-bis{1-(2-ethyl-4-phenylindenyl)}zirconium dichloride, rac-methylene-bis{1-(2-ethyl-4-(α-naphthyl)indenyl)}zirconium dichloride, rac-ethylene-bis{1-(2-ethyl-4-phenylindenyl)}zirconium dichloride, rac-ethylene-bis{1-(2-ethyl-4-α-naphthyl) indenyl)}zirconium dichloride, rac-ethylene-bis{1-(2-n-propyl-4-(α-naphthyl)indenyl)}zirconium dichloride, rac-dimethylgermyl-bis{1-(2-ethyl-4-phenylindenyl)} zirconium dichloride, rac-dimethylgermyl-bis{1-(2-ethyl-4-(α-naphthyl)indenyl)}zirconium dichloride and rac-dimethylgermyl-bis{1-(2-n-propyl-4-phenylindenyl)} zirconium dichloride.

Compounds wherein zirconium is replaced with titanium or hafnium in the above compounds are also employable. In the present invention, the above metallocene compounds are each generally used as a racemic modification as the catalyst component, but they may be used as R form or S form.

In the present invention, the metallocene compounds mentioned above may be used in combination of two or more kinds. Such metallocene compounds can be prepared in accordance with European Patent Laid-Open Publication No. 0,320,762 and Journal of Organometallic Chem., 288 (1985), pp. 63–67.

Other than the metallocene compound represented by the formula (II), a metallocene compound represented by the following formula (III) is also employable.

wherein M is a metal of Group IV of the periodic table or lanthamide series, $L^a$ is a derivative of a delocalized n bonding group and imparts a restraint geometrical shape to the active site of the metal M, and each X is independently a hydrogen atom, a halogen atom, a hydrocarbon group having 20 or less carbon atoms, a silyl group having 20 or less silicon atoms or a germyl group having 20 or less germanium atoms.

Of the compounds represented by the formula (III), a compound represented by the following formula (IIIa) is preferable.

In the above formula, M is titanium, zirconium or hafnium, X is the same as described above, and Cp is π-bonded to M and is a substituted cyclopentadienyl group having a substituent group Z or its derivative.

Z is oxygen, sulfur, boron or an element of Group IVA of the periodic table (e.g., silicon, germanium, tin), Y is a ligand containing nitrogen, phosphorus, oxygen or sulfur, and Z and Y may together form a condensed ring.

Examples of the metallocene compounds represented by the formula (IIIa) include (dimethyl(t-butylamido) (tetramethyl-η5-cyclopentadienyl)silane)titanium dichloride, ((t-butylamido)(tetramethyl-[5-cyclopentadienyl)-1,2-ethanediyl)titanium dichloride, (dibenzyl(t-butylamido)(tetramethyl-η5-cyclopentadienyl) silane)titanium dichloride, (dimethyl(t-butylamido) (tetramethyl-η5-cyclopentadienyl)silane)dibenzyltitanium, (dimethyl(t-butylamido)(tetramethyl-η5-cyclopentadienyl) silane)dimethyltitanium, ((t-butylamido)(tetramethyl-η5-cyclopentadienyl)-1,2-ethanediyl)dibenzyltitanium, ((methylamido)(tetramethyl-η5-cyclopentadienyl)-1,2-ethanediyl)dineopentyltitanium, ((pheylphosphido) (tetramethyl-η5-cyclopentadienyl)methylene) diphenyltitanium, (dibenzyl(t-butylamido)(tetramethyl-η5-cyclopentadienyl)silane)dibenzyltitanium, (dimethyl (benzylamido)(η5-cyclopentadienyl)silane)di (trimethylsilyl)titanium, (dimethyl(phenylphosphido)- (tetramethyl-η5-cyclopentadienyl)silane)dibenzyltitanium, ((tetramethyl-η5-cyclopentadienyl)-1,2-ethanediyl) dibenzyltitanium, (2-η5-tetramethyl-cyclopentadienyl)-1-methyl-ethanolate(2-))dibenzyltitanium, (2-[5-tetramethyl-cyclopentadienyl)-1-methyl-ethanolate(2-)) dimethyltitanium, (2-((4a,4b,8a,9,9a-η)-9H-fluorene-9-yl) cyclohexanolate(2-))dimethyltitanium and (2-((4a,4b,8a,9, 9a-η)-9H-fluorene-9-yl)cyclohexanolate(2-)) dibenzyltitanium.

In the present invention, the above metallocene compounds represented by the formula (III) may be used in combination of two or more kinds. In the above description, titanium compounds are exemplified as the metallocene compounds, but compounds wherein titanium is replaced with zirconium or hafnium in those titanium compounds are also employable.

The compounds mentioned above may be used singly or in combination of two or more kinds. Of the above-mentioned metallocene compounds, the metallocene compound represented by the formula (II) is preferably used in the preparation of the long-chain branched ethylene/α-olefin random copolymer.

Organoaluminum Oxy-Compound (B)

The organoaluminum oxy-compound (B) for use in the invention may be an aluminoxane hitherto known or such a benzene-insoluble organoaluminum oxy-compound as exemplified in Japanese Patent Laid-Open Publication No. 78687/1990.

The hitherto known aluminoxane can be prepared by, for example, the following processes.

(1) An organoaluminum compound such as trialkylaluminum is added to a hydrocarbon medium suspension of a compound containing adsorption water or a salt containing water of crystallization, e.g., magnesium chloride hydrate, copper sulfate hydrate, aluminum sulfate hydrate, nickel sulfate hydrate or cerous chloride hydrate, to allow the organoaluminum compound to react with the adsorption water or the water of crystallization, and the aluminoxane is recovered as a hydrocarbon solution.

(2) Water, ice or water vapor is allowed to directly act on an organoaluminum compound such as trialkylaluminum in a medium such as benzene, toluene, ethyl ether or tetrahydrofuran, and the aluminoxane is recovered as a hydrocarbon solution.

(3) An organotin oxide such as dimethyltin oxide or dibutyltin oxide is allowed to react with an organoaluminum compound such as trialkylaluminum in a medium such as decane, benzene or toluene.

The aluminoxane may contain a small amount of an organometallic component. It is also available to distill off the solvent or the unreacted organoaluminum compound from the recovered solution of aluminoxane, followed by redissolving the remainder in a solvent.

Examples of the organoaluminum compounds used for preparing the aluminoxane include trialkylaluminums, such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum; tricycloalkylaluminums, such as tricyclohexylaluminum and tricyclooctylaluminum; dialkylaluminum halides, such as dimethylaluminum chloride, diethylaluminum chloride, diethylaluminum bromide and diisobutylaluminum chloride; dialkylaluminum hydrides, such as diethylaluminum hydride and diisobutylaluminum hydride; dialkylaluminum alkoxides, such as dimethylaluminum methoxide and diethylaluminum ethoxide; and dialkylaluminum aryloxides, such as diethylaluminum phenoxide.

Of these, trialkylaluminums and tricycloalkylaluminums are particularly preferable. As the organoaluminum compound used for preparing the aluminoxane, isoprenylaluminum represented by the formula $(i-C_4H9)_xAl_y(C_5H_{10})_z$ (wherein x, y and z are each a positive number, and $z \geq 2x$) is also employable.

The organoaluminum compounds mentioned above may be used in combination of two or more kinds.

Examples of the solvents used for preparing the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halogenated products of these aromatic, aliphatic and alicyclic hydrocarbons, particularly chlorinated or brominated products thereof. Also employable are ethers such as ethyl ether and tetrahydrofuran. Of the solvents, aromatic hydrocarbons are particularly preferable.

Compound (C) Which Reacts with the Metallocene Compound (A) to Form Ion Pair

Examples of the compounds (C) which react with the metallocene compound (A) to form an ion pair include Lewis acid, an ionic compound, a borane compound and a carborane compound described in Japanese Patent Laid-Open Publications No. 501950/1989 and No. 502036/1989, No. 179005/1991, No. 179006/1991, No. 207703/1991 and No. 207704/1991, and U.S. Pat. No. 5,321,106.

The Lewis acid includes Mg-containing Lewis acid, Al-containing Lewis acid and B-containing Lewis acid. Of these, B-containing Lewis acid is preferable.

The Lewis acid containing a boron atom is, for example, a compound represented by the following formula:

$$BR^1R^2R^3$$

wherein $R^1$, $R^2$ and $R^3$ are each independently a phenyl group which may have a substituent group such as fluorine, methyl or trifluoromethyl, or a fluorine atom.

Examples of the compounds represented by the above formula include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron. Of these, particularly preferable is tris(pentafluorophenyl)boron.

The ionic compound for use in the invention is a salt comprising a cationic compound and an anionic compound. The anion reacts with the metallocene compound (A) to render the metallocene compound (A) cationic and to form an ion pair so as to stabilize the transition metal cation. Examples of such anions include organoboron compound anion, organoarsenic compound anion and organoaluminum compound anion. An anion which is relatively bulky and stabilizes the transition metal cation is preferable. Examples of cations include metallic cation, organometallic cation, carbonium cation, tripium cation, oxonium cation, sulfonium cation, phosphonium cation and ammonium cation. Specifically, there can be mentioned, for example, triphenylcarbenium cation, tributylammonium cation, N,N-dimethylammonium cation and ferrocenium cation.

In the present invention, an ionic compound containing organoboron compound anion is preferable, and examples such compounds include trialkyl-substituted ammonium salts, such as triethylammoniumtetra(phenyl)boron, tripropylammoniumtetra(phenyl)boron, tri(n-butyl)ammoniumtetra(phenyl)boron, trimethylammoniumtetra(p-tolyl)boron, trimethylammoniumtetra(o-tolyl)boron, tributylammoniumtetra(pentafluorophenyl)boron, tripropylammoniumtetra(o,p-dimethylphenyl)boron, tributylammoniumtetra(m,m-dimethylphenyl)boron, tributylammoniumtetra(p-trifluoromethylphenyl)boron, tri(n-butyl)ammoniumtetra(o-tolyl)boron and tri(n-butyl)ammoniumtetra(4-fluorophenyl)boron; N,N,-dialkylanilinium salts, such as N,N-dimethylaniliniumtetra(phenyl)boron, N,N-diethylaniliniumtetra(phenyl)boron and N,N-2,4,6-pentamethylaniliniumtetra(phenyl)boron; dialkylammonium salts, such as di(n-propyl)ammoniumtetra(pentafluorophenyl)boron and dicyclohexylammoniumtetra(phenyl)boron; and triarylphosphonium salts, such as triphenylphosphoniumtetra(phenyl)boron, tri(methylphenyl)phosphoniumtetra(phenyl)boron and tri(dimethylphenyl)phosphoniumtetra(phenyl)boron.

As the ionic compounds containing a boron atom, triphenylcarbeniumtetrakis(pentafluorophenyl)borate, N,N-dimethylaniliniumtetrakis(pentafluorophenyl)borate and ferroceniumtetrakis(pentafluorophenyl)borate are also employable in the invention.

The following ionic compounds containing a boron atom are also employable. (In the ionic compounds enumerated below, the counter ion is tri(n-butyl)ammonium, but the counter ion is not limited thereto.)

That is, there can be mentioned salts of anions, such as bis[tri(n-butyl)ammonium]nonaborate, bis[tri(n-butyl)ammonium]decaborate, bis[tri(n-butyl)ammonium]undecaborate, bis[tri(n-butyl)ammonium]dodecaborate, bis[tri(n-butyl)ammonium]decachlorodecaborate, bis(tri(n-butyl)ammonium]dodecachlorododecaborate, tri(n-butyl)ammonium-1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate and tri(n-butyl)ammoniumbromo-1-carbadodecaborate.

The following borane compounds and carborane compounds are also employable. These compounds are each used as Lewis acid or the ionic compound.

Examples of the borane compounds, carborane complex compounds and salts of carborane anions include decaborane(14), 7,8-dicarbaundecaborane(13), 2,7-dicarbaundecaborane(13), undecahydrido-7,8-dimethyl-7,8-dicarbaundecaborane, dodecahydrido-11-methyl-2,7-dicarbaundecaborane, tri(n-butyl)ammonium-6-carbadecaborate(14), tri(n-butyl)ammonium-6-carbadecaborate(12), tri(n-butyl)ammonium-7-carbaundecaborate(13), tri(n-butyl)ammonium-7,8-dicarbaundecaborate(12), tri(n-butyl)ammonium-2,9-dicarbaundecaborate(12), tri(n-butyl)ammoniumdodecahydrido-8-methyl-7,9-dicarbaundecaborate, tri(n-butyl)ammoniumundecahydrido-8-ethyl-7,9-dicarbaundecaborate, tri(n-butyl)ammoniumundecahydrido-8-butyl-7,9-dicarbaundecaborate, tri(n-butyl)ammoniumundecahydrido-8-allyl-7,9-dicarbaundecaborate, tri(n-butyl)ammoniumundecahydrido-9-trimethylsilyl-7,8-dicarbaundecaborate and tri(n-butyl)ammoniumundecahydrido-4,6-dibromo-7-carbaundecaborate.

Examples of the carborane compounds and salts of carboranes include 4-carbanonaborane(14), 1,3-dicarbanonaborane(13), 6,9-dicarbadecaborane(14), dodecahydrido-1-phenyl-1,3-dicarbanonaborane, dodecahydrido-1-methyl-1,3-dicarbanonaborane and undecahydrido-1,3-dimethyl-1,3-dicarbanonaborane.

The following compounds are also employable. (In the ionic compounds enumerated below, the counter ion is tri(n-butyl)ammonium, but the counter ion is not limited thereto.)

Examples of salts of metallic carboranes and metallic borane anions include tri(n-butyl)ammoniumbis (nonahydrido-1,3-dicarbanonaborate)cobaltate(III), tri(n-butyl)ammoniumbis(undecahydrido-7,8-dicarbaundecaborate)ferrate(III), tri(n-butyl)ammoniumbis (undecahydrido-7,8-dicarbaundecaborate)cobaltate(III), tri (n-butyl)ammoniumbis(undecahydrido-7,8-dicarbaundecaborate)nickelate(III), tri(n-butyl) ammoniumbis(undecahydrido-7,8-dicarbaundecaborate) cuprate(III), tri(n-butyl)ammoniumbis(undecahydrido-7,8-dicarbaundecaborate)aurate(III), tri(n-butyl)ammoniumbis (nonahydrido-7,8-dimethyl-7,8-dicarbaundecaborate)ferrate (III), tri(n-butyl)ammoniumbis(nonahydrido-7,8-dimethyl-7,8-dicarbaundecaborate)chromate(III), tri(n-butyl) ammoniumbis(tribromooctahydrido-7,8-dicarbaundecaborate)cobaltate(III), tri(n-butyl) ammoniumbis(dodecahydridodicarbadodecaborate)-cobaltate(III), bis[tri(n-butyl)ammonium]bis (dodecahydridododecaborate)-nickelate(III), tris[tri(n-butyl)ammonium]bis(undecahydrido-7-carbaundecaborate) chromate(III), bis[tri(n-butyl)ammonium]bis (undecahydrido-7-carbaundecaborate)manganate(IV), bis (tri(n-butyl) ammonium)]bis(undecahydrido-7-carbaundecaborate)cobaltate(III) and bis[tri(n-butyl) ammonium]bis(undecahydrido-7-carbaundecaborate) nickelate(IV).

The compounds [C] mentioned above may be used in combination of two or more kinds.

Organoaluminum Compound (D)

The organoaluminum compound (D) for use in the invention can be represented by, for example, the following formula (Dl):

$$R^5{}_n AlX_{3-n} \quad (D1)$$

wherein $R^5$ is a hydrocarbon group of 1 to 12 carbon atoms, X is a halogen atom or a hydrogen atom, and n is 1 to 3.

In the formula (D1), $R^5$ is a hydrocarbon group of 1 to 12 carbon atoms, e.g., an alkyl group, a cycloalkyl group or an aryl group. Examples of such groups include methyl, ethyl, n-propyl, isopropyl, isobutyl, pentyl, hexyl, octyl, cyclopentyl, cyclohexyl, phenyl and tolyl.

Examples of the organoaluminum compounds include trialkylaluminums, such as trimethylaluminum, triethylaluminum, triisopropylaluminum, triisobutylaluminum, trioctylaluminum and tri-2-ethylhexylaluminum; alkenylaluminums, such as isoprenylaluminum; dialkylaluminum halides, such as dimethylaluminum chloride, diethylaluminum chloride, diisopropylaluminum chloride, diisobutylaluminum chloride and dimethylaluminum bromide; alkylaluminum sesquihalides, such as methylaluminum sesquichloride, ethylaluminum sesquichloride, isopropylaluminum sesquichloride, butylaluminum sesquichloride and ethylaluminum sesquibromide; alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound (D) is a compound represented by the following formula (D2):

$$R^5{}_n AlY_{3-n} \quad (D2)$$

wherein $R^5$ is the same as $R^5$ in the formula (Dl); Y is —$OR^6$-group, —$OSiR^7{}_3$ group, —$OAlR^8{}_2$ group, —$NR^9{}_2$ group, —$SiR^{10}{}_3$ group or —$N(R^{11})AlR^{12}{}_2$ group; n is 1 to 2; $R^6$, $R^7$, $R^8$ and $R^{12}$ are each methyl, ethyl, isopropyl, isobutyl, cyclohexyl, phenyl or the like; $R^9$ is hydrogen, methyl, ethyl, isopropyl, phenyl, trimethylsilyl or the like; and $R^{10}$ and $R^{11}$ are each methyl, ethyl or the like.

Examples of such organoaluminum compounds include:
(i) compounds represented by $R^5{}_n Al(OR^6)_{3-n}$, such as dimethylaluminum methoxide, diethylaluminum ethoxide and diisobutylaluminum methoxide;
(ii) compounds represented by $R^5{}_n Al(OSiR^7{}_3)_{3-n}$; such as $(C_2H_5)_2Al(OSi(CH_3)_3)$, $(iso\text{-}C_4H_9)_2Al(OSi(CH_3)_3)$ and $(iso\text{-}C_4H_9)_2Al(OSi(C_2H_5)_3)$;
(iii) compounds represented by $R^5{}_n Al(OAlR^8{}_2)_{3-n}$, such as $(C_2H_5)_2Al(OAl(C_2H_5)_2)$ and $(iso\text{-}C_4H_9)_2Al(OAl(iso\text{-}C_4H_9)_2)$;
(iv) compounds represented by $R^5{}_n Al(NR^9{}_2)_{3-n}$, such as $(CH_3)_2Al(N(C_2H_5)_2)$, $(C_2H_5)_2Al(NH(CH_3))$, $(CH_3)_2Al(NH(C_2H_5))$, $(C_2H_5)_2Al[N(Si(CH_3)_3)_2]$ and $(iso\text{-}C_4H_9)_2 Al[N(Si(CH_3)_3)_2]$; and
(v) compounds represented by $R^5{}_n Al(SiR^{10}{}_3)_{3-n}$, such as $(iso\text{-}C_4H_9)_2Al(Si(CH_3)_3)$.

Of these, preferable are organoaluminum compounds represented by $R^5{}_3Al$, $R^5{}_n Al(OR^6)_{3-n}$ and $R^5(OAlR^8{}_2)_{3-n}$, and particularly preferable are compounds wherein $R^5$ is an isoalkyl group and n is 2. The organoaluminum compounds mentioned above may be used in combination of two or more kinds.

The specific metallocene catalyst for use in the invention contains the metallocene compound (A), and the catalyst can be prepared from the metallocene compound (A) and the organoaluminum oxy-compound (B). The metallocene catalyst may be formed from the metallocene compound (A) and the compound (C) which reacts with the metallocene compound (A) to form an ion pair, or may be formed from the metallocene compound (A), the organoaluminum oxy-compound (B) and the compound (C) which reacts with the metallocene compound (A) to form an ion pair. In these embodiments, it is particularly preferable to use the organoaluminum compound (D) in combination.

In the present invention, the metallocene compound (A) 1 is used in an amount of usually about 0.00005 to 0.1 mmol, preferably about 0.0001 to 0.05 mmol, in terms of the transition metal atom, based on 1 liter of the polymerization volume.

The organoaluminum oxy-compound (B) can be used in such an amount that the amount of the aluminum atom becomes usually about 1 to 10,000 mol, preferably 10 to 5,000 mol, based on 1 mol of the transition metal atom.

The compound (C) which reacts with the metallocene compound (A) to form an ion pair is used in such an amount that the amount of the boron atom becomes usually about 0.5 to 20 mol, preferably 1 to 10 mol, based on 1 mol of the transition metal atom.

The organoaluminum compound (D) is used, if necessary, in an amount of usually about 0 to 1,000 mol, preferably about 0 to 500 mol, based on 1 mol of the aluminum atom in the organoaluminum oxy-compound (B) or the boron atom in the compound (C) which forms an ion pair.

When ethylene and an α-olefin of 6 to 20 carbon atoms are copolymerized using the metallocene compound mentioned above, a linear or long-chain branched ethylene/α-olefin random copolymer can be obtained with a high polymerization activity.

Even if ethylene and an α-olefin of 6 to 20 carbon atoms are copolymerized using a Group VB transition metal compound catalyst such as a vanadium catalyst, it is impossible to obtain a linear or long-chain branched ethylene/α-olefin random copolymer with a high polymerization activity.

In the copolymerization of ethylene and the α-olefin of 6 to 20 carbon atoms, the metallocene compound (A), the organoaluminum oxy-compound (B), the compound (C) for forming an ion pair and the organoaluminum compound (D), which are used to form a metallocene catalyst, may be individually fed to the polymerization reactor, or a previously prepared metallocene catalyst containing the metallocene compound (A) may be used for the copolymerization reaction.

In the preparation of the metallocene catalyst, a hydrocarbon solvent that is inert to the catalyst components can be used. Examples of the inert hydrocarbon solvents include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; and halogenated hydrocarbons, such as ethylene chloride, chlorobenzene and dichloromethane. These hydrocarbon solvents can be used singly or in combination.

The metallocene compound (A), the organoaluminum oxy-compound (B), the compound (C) which forms an ion pair and the organoaluminum compound (D) can be contacted and mixed with each other at a temperature of usually −100 to 200° C., preferably −70 to 100° C.

In the present invention, copolymerization of ethylene and the α-olefin of 6 to 20 carbon atoms can be carried out under the conditions of a temperature of usually 40 to 200° C., preferably 50 to 150° C., particularly preferably 60 to 120° C., and a pressure of atmospheric pressure to 100 kg/cm$^2$, preferably atmospheric pressure to 50 kg/cm$^2$, particularly preferably atmospheric pressure to 30 kg/cm$^2$.

Although the copolymerization reaction can be conducted by various polymerization processes, it is preferable to conduct the copolymerization by a solution polymerization process. Examples of polymerization solvents employable in the solution polymerization include the aforesaid hydrocarbon solvents.

Although the copolymerization can be conducted by any of batchwise, semi-continuous and continuous processes, it is preferable to conduct the copolymerization continuously. The copolymerization may be conducted in two or more steps under different reaction conditions.

The linear or long-chain branched ethylene/α-olefin random copolymer preferably used in the invention is obtained by the aforesaid process, and the molecular weight of the resulting copolymer can be regulated by changing the polymerization conditions such as polymerization temperature or controlling the amount of hydrogen (molecular weight modifier) used.

Preparation of Graft Modified Ethylene/α-olefin Random Copolymer

The graft modified ethylene/α-olefin random copolymer is prepared by graft copolymerizing the above-mentioned unmodified ethylene/α-olefin random copolymer with a polar monomer. The (polar monomer) is, for example, a hydroxyl group-containing ethylenically unsaturated compound, an amino group-containing ethylenically unsaturated compound, an epoxy group-containing ethylenically unsaturated compound, an unsaturated carboxylic acid, an anhydride or a derivative thereof, a vinyl ester compound, or vinyl chloride. Particularly, an unsaturated carboxylic acid or an anhydride thereof is preferable.

Examples of the hydroxyl group-containing unsaturated compounds include hydroxyl group-containing (meth)acrylic esters, such as hydroxyethyl(meth)acrylate, 2-hydroxypropyl (meth)acrylate, 3-hydroxypropyl(meth)acrylate, 2-hydroxy-3-phenoxypropyl(meth)acrylate, 3-chloro-2-hydroxypropyl (meth)acrylate, glycerol mono (meth)acrylate, pentaerythritol mono(meth)acrylate, trimethylolpropane mono(meth)acrylate, tetramethylolethane mono(meth)acrylate, butanediol mono(meth)acrylate, polyethylene glycol mono(meth)acrylate and 2-(6-hydrohexanoyloxy)ethyl acrylate, 10-undecene-1-ol, 1-octene-3-ol, 2-methanol norbornene, hydroxystyrene, N-methylolacrylamide, 2-(meth)acryloyloxyethyl acid phosphate, glycerol monoallyl ether, allyl alcohol, allyloxyethanol, 2-butene-1,4-diol and glycerol monoalcohol.

The amino group-containing ethylenically unsaturated compound is, for example, a vinyl monomer containing at least one amino group or substituted amino group represented by the following formula:

—NR$^1$R$^2$— wherein R$^1$ is a hydrogen atom, a methyl group or an ethyl group, and R$^2$ is a hydrogen atom, an alkyl group of 1 to 12 carbon atoms, preferably 1 to 8 carbon atoms, or a cycloalkyl group of 8 to 12 carbon atoms, preferably 6 to 9 carbon atoms. The alkyl group and the cycloalkyl group may further have a substituent group.

Examples of such amino group-containing ethylenically unsaturated compounds include:

alkyl ester type derivatives of acrylic acid or methacrylic acid, such as aminomethyl(meth)acrylate, propylaminoethyl(meth)acrylate, dimethylaminoethyl methacrylate, aminopropyl(meth)acrylate, phenylaminomethyl methacrylate and cyclohexylaminoethyl methacrylate;

vinylamine type derivatives, such as N-vinyldiethylamine and N-acetylvinylamine;

acrylamide type derivatives, such as acrylamide, methacrylamide, N-methylacrylamide, N,N-dimethylacrylamide and N,N-dimethylaminopropylacrylamide; and imides, such as p-aminohexylsuccinimide and 2-aminoethylsuccinimide.

As the epoxy group-containing ethylenically unsaturated compound, a monomer having a polymerizable unsaturated bonding group and at least one epoxy group in one molecule is employed. Examples of such epoxy group-containing ethylenically unsaturated compounds include glycidyl esters of unsaturated carboxylic acids, such as glycidyl acrylate and glycidyl methacrylate; monoglycidyl esters (number of carbon atoms of alkyl group in case of monoglycidyl ester: 1 to 12) of unsaturated dicarboxylic acids such as maleic acid, fumaric acid, crotonic acid, tetrahydrophthalic acid, itaconic acid, citraconic acid, endo-cis-bicyclo[2.2.1]hept-5-ene-2,3-dicarboxylic acid (Nadic acid™) and endo-cis-bicyclo[2.2.1]hept-5-ene-2-methyl-2,3-dicarboxylic acid. (Methylnadic acid™); alkyl glycidyl esters of p-styrenecarboxylic acid; allyl glycidyl ether; 2-methylallyl glycidyl ether; styrene-p-glycidyl ether; 3,4-epoxy-1-butene; 3,4-epoxy-3-methyl-1-butene; 3,4-epoxy-1-pentene; 3,4-epoxy-3-methyl-1-pentene; 5,6-epoxy-1-hexene; and vinylcyclohexene monoxide.

Examples of the unsaturated carboxylic acids include acrylic acid, methacrylic acid, maleic acid, fumaric acid, tetrahydrophthalic acid, itaconic acid, citraconic acid, crotonic acid, isocrotonic acid, norbornenedicarboxylic acid, bicyclo[2.2.1]hept-2-ene-5,6-dicarboxylic acid, and derivatives of these acids (e.g., acid anhydrides, acid halides, amides, imides, esters).

Examples of such derivatives include malonyl chloride, maleimide, maleic anhydride, itaconic anhydride, citraconic anhydride, teetrahydrophthalic anhydride, bicyclo[2.2.1]hept-2-ene-5,6-dicarboxylic anhydride, dimethyl maleate, monomethyl maleate, diethyl maleate, diethyl fumarate, dimethyl itaconate, diethyl citraconate, dimethyl tetrahydrophthalate, dimethyl bicyclo[2.2.1]hept-2-ene-5,6-dicarboxylate, hydroxyethyl (meth)acrylate, hydroxypropyl (meth)acrylate, glycidyl (meth)acrylate, aminoethyl methacrylate and aminopropyl methacrylate.

Examples of the vinyl ester compounds include vinyl acetate, vinyl propionate, vinyl n-butyrate, vinyl isobutyrate, vinyl pivalate, vinyl caproate, vinyl versatate, vinyl laurate, vinyl stearate, vinyl benzoate, vinyl salicylate and vinyl cyclohexanecarboxylate.

These polar monomers may be used singly or in combination of plural kinds.

For graft copolymerization of the ethylene/α-olefin random copolymer with at least one polar monomer selected from the above polar monomers, various methods are adoptable. For example, there can be mentioned a method comprising dissolving the ethylene/α-olefin random copolymer in an organic solvent, adding the polar monomer and a radical polymerization initiator and heating the mixture with stirring to perform graft copolymerization reaction, a method comprising melting the ethylene/α-olefin random copolymer under heating, adding the polar monomer and a radical polymerization initiator to the molten copolymer and stirring the mixture to perform graft copolymerization reaction, a method comprising mixing the ethylene/α-olefin random copolymer, the polar monomer and a radical polymerization initiator, feeding the mixture to an extruder and kneading it under heating to perform graft copolymerization reaction, and a method comprising impregnating the ethylene/α-olefin random copolymer with a solution of the polar monomer and a radical polymerization initiator in an organic solvent and heating the impregnated copolymer up to the highest temperature among temperatures at which the ethylene/α-olefin random copolymer is not melted to perform graft copolymerization reaction.

The reaction temperature is usually not lower than 50° C., preferably in the range of 80 to 200° C., and the reaction time is in the range of about 1 to 10 hours.

The reaction may be conducted batchwise or continuously, but for the purpose of homogeneous graft copolymerization, it is preferable to conduct the reaction batchwise.

In case of polymerization using a radical polymerization initiator, any radical polymerization initiator is employable 1 if the initiator accelerates the reaction of the ethylene/α-olefin random copolymer with the polar monomer, but it is preferable to use an organic peroxide or an organic perester.

Examples of such radical polymerization initiators include benzoyl peroxide, dichlorobenzoyl peroxide, dicumyl peroxide, di-tert-butyl peroxide, 2,5-dimethyl-2,5-di(peroxybenzoate)hexyne-3,1,4-bis(tert-butylperoxyisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxide)hexane, tert-butyl benzoate, tert-butyl perphenyl acetate, tert-butyl perisobutyrate, tert-butyl per-sec-octoate, tert-butyl perpivalate, cumyl perpivalate and tert-butyl perdiethyl acetate. In addition, azo compounds, such as azobisisobutyronitrile and dimethylazoisobutyronitrile, are also employable.

Of these, dialkyl peroxides, such as dicumyl peroxide, di-tert-butyl peroxide, 2,5-dimethyl-2,5-di(tert-butylperoxy) hexyne-3,2,5-dimethyl-2,5-di(tert-butylperoxy)hexane and 1,4-bis(tert-butylperoxyisopropyl)benzene, are preferable.

The radical polymerization initiator is preferably used in an amount of about 0.001 to 10 parts by weight based on 100 parts by weight of the ethylene/α-olefin random copolymer.

As described above, the graft copolymerization reaction can be carried out in an organic solvent or without using any solvent. The resin dispersion of the invention is a dispersion comprising the ethylene/α-olefin random copolymer dispersed in an organic solvent. When the reaction is carried out in an organic solvent, the reaction product can be used as it is or after further addition of the same or different kind of an organic solvent. When the reaction is carried out without using any solvent, the resin dispersion of the invention can be prepared by adding an organic solvent to the reaction product.

The (organic solvent) which is added during or after the reaction to form an adhesive or the like, is not specifically restricted, and examples thereof include aromatic hydrocarbons, such as benzene, toluene and xylene; aliphatic hydrocarbons, such as hexane, heptane, octane and decane; alicyclic hydrocarbons, such as cyclohexane, cyclohexene and methylcyclohexane; alcohols, such as methanol, ethanol, isopropyl alcohol, butanol, pentanol, hexanol, propanediol and phenol; ketone type solvents, such as acetone, methyl isobutyl ketone, methyl ethyl ketone, pentanone, hexanone, isophorone and acetophenone; cellosolves, such as methyl cellosolve and ethyl cellosolve; esters, such as methyl acetate, ethyl acetate, butyl acetate, methyl propionate and butyl formate; halogenated hydrocarbons, such as trichloroethylene, dichloroethylene and chlorobenzene. Of these, aromatic hydrocarbons, aliphatic hydrocarbons and ketones are preferable. These organic solvents may be used singly or in combination of two or more kinds.

In the graft modified ethylene/α-olefin random copolymer for use in the invention, the content (graft quantity) of a component derived from the polar monomer is in the range of 0.1 to 15% by weight, preferably 0.5 to 10% by weight, based on 100% by weight of the graft-modified copolymer. Such a graft modified ethylene/α-olefin random copolymer can be prepared by controlling the aforesaid graft reaction conditions so as to adjust the content of the polar monomer component within the above range.

The graft modified ethylene/α-olefin random copolymer can be prepared also by mixing a graft modified copolymer having a larger graft quantity with an unmodified copolymer in such a mixing ratio that the graft quantity in the resulting modified copolymer becomes 0.1 to 15% by weight, preferably 0.5 to 10% by weight.

In the mixing of the graft modified copolymer with the unmodified copolymer, for example, 95 to 5 parts by weight of the unmodified copolymer is used based on 5 to 95 parts by weight of the graft modified copolymer.

In the resin dispersion of the invention, the ethylene/α-olefin random copolymer described above is dispersed in the form of solid particles in an organic solvent.

There is no specific limitation on the solid concentration and the viscosity of the resin dispersion of the invention, and they can be appropriately determined according to the use of the resin dispersion.

For example, in the use of the resin dispersion of the invention as an adhesive, a dispersion having a solid concentration of 3 to 50% by weight and a solution viscosity (measured by a B type viscometer) of about 5 to 4000 cps is preferable from the viewpoint of workability in the adhesion process, though these values vary depending upon the types of the graft modified ethylene/α-olefin random copolymer and the solvent.

In the resin dispersion of the invention, the diameters (measured by a Coulter Counter) of the solid particles of the graft modified ethylene/α-olefin random copolymer are in the range of preferably 1 to 50 μm, particularly preferably 3 to 30 μm.

To the resin dispersion of the invention, (known additives,) such as pigment, filler and stabilizer, can be optionally added within limits not detrimental to the objects of the invention.

(The resin dispersion of the invention can be prepared by, for example, the following process.) First, the graft modified ethylene/α-olefin random copolymer is mixed with an organic solvent, and the mixture is heated to completely dissolve the copolymer in the solvent. The temperature for dissolution is usually in the range of 100 to 150° C. Then, the solution is cooled to precipitate the modified ethylene/α-olefin random copolymer. For the precipitation, it is necessary to set composition of the solvent so that the copolymer is precipitated at a temperature of 50 to 90° C. and to adjust the average cooling rate during the precipitation to 1 to 20° C./hr, preferably 2 to 10° C./hr. It is also available to dissolve the copolymer in only a master solvent to perform precipitation, followed by adding a poor solvent to perform further precipitation.

The resin dispersion of the invention described above is favorably used as an adhesive or a heat-sealing material for bonding polyolefins to each other or polyolefin to metal, or as a coating material or a primer for coating polyolefin members or metal members.

For example, the resin dispersion of the invention is applied to a metal plate to produce a resin-coated metal plate. In this case, the resin dispersion of the invention is applied to a plate or foil of a metal such as aluminum or stainless steel, using a roll coater or the like, and the solvent is removed to form a coating film having a thickness of about 0.5 to 10 μm.

If the coating film is used as a primer layer and if a finish coating is applied to the surface thereof to form a finish layer, a metal plate with a multilayer coating film having excellent interlaminar adhesion strength can be obtained. If the coating film is used as an adhesive layer and if a polyolefin sheet or film is laminated on the surface thereof, a laminate having excellent interlaminar strength can be obtained.

Effect of the Invention

The resin dispersion of the invention exhibits excellent adhesion properties as an adhesive or a heat-sealing adhesive for bonding polyolefins to each other or polyolefin to metal, so that it can be effectively used as an adhesive for packaging, an adhesive for lamination, a coating material or a primer. According to the dispersion of the invention, a resin-coated metal plate having excellent adhesion strength between the coating film and the metal plate can be obtained.

EXAMPLE

The present invention is further described with reference to the following examples, but it should be construed that the invention is in no way limited to those examples.

Example 1

Preparation of Ethylene/1-octene Random Copolymer

Preparation of Catalyst Solution

In a glass flask thoroughly purged with nitrogen, 0.5 mg of bis(1,3-dimethylcyclopentadienyl)zirconium chloride was placed, and then 1.57 ml of a toluene solution of methylaluminoxane (Al: 1.1 mol/liter) and 2.76 ml of toluene were further added to obtain a catalyst solution.

Polymerization

In a 2-liter stainless steel autoclave thoroughly purged with nitrogen, 720 ml of hexane, 150 ml of 1-octene and 30 ml of hydrogen were placed, and the temperature of the system was raised to 60° C. Subsequently, 1 mmol of triisobutylaluminum and 0.5 ml (0.001 mmol in terms of Zr) of the catalyst solution prepared above were injected with ethylene to initiate polymerization. Thereafter, only ethylene was continuously fed to keep the total pressure at 4.0 kg/cm$^2$-G, and the polymerization was conducted at 70° C. for 60 minutes. After a small amount of ethanol was fed to the system to terminate the polymerization, the system was purged of the unreacted ethylene. The resulting polymer was introduced into a large excess of methanol to precipitate a polymer. The polymer was separated by filtration and dried one night under reduced pressure to obtain a linear ethylene/1-octene random copolymer.

The copolymer thus obtained had an octene content of 7% by mol, an intrinsic viscosity (i), as measured in decalin at 135° C., of 1.1 dl/g, a glass transition temperature of −52° C., a crystallinity, as measured by X-ray diffractometry, of 20%, a molecular weight distribution (Mw/Mn), as measured by GPC, of 2.0, a B value of 1.1 and a gη* value of 1.0.

Preparation of Maleic Anhydride Graft Modified Ethylene/1-octene Random Copolymer In a 15-liter autoclave equipped with a stirrer, 3966 g of toluene and 700 g of the random copolymer obtained above were placed, and the autoclave was thoroughly purged with nitrogen. Then, the temperature of the system was raised to 145° C. with stirring. While keeping the temperature, a solution of 12.0 g of di-t-butyl peroxide in 39.2 g of toluene and a solution of 51.6 q of maleic anhydride in 39.2 g of toluene were dropwise added over a period of 4 hours. After the dropwise addition was completed, the reaction was further conducted at 145° C. for 2 hours. After the reaction was completed, the solution was cooled to room temperature, and acetone was added to the solution to precipitate a modified random copolymer. The modified random copolymer thus precipitated was washed repeatedly with acetone and then dried to obtain a sample. The modified random copolymer had an intrinsic viscosity (η) of 1.1 dl/g and a maleic anhydride graft quantity of 1.2% by weight.

This maleic anhydride graft modified ethylene/1-octene random copolymer had a glass transition temperature of −60° C., a crystallinity, as measured by X-ray diffractometry, of 20%, a molecular weight distribution (Mw/Mn), as measured by GPC, of 2.0 and a B value of 1.1.

Preparation of Resin Dispersion and Evaluation Thereof

In the above-mentioned autoclave equipped with a stirrer, 550 q of the modified random copolymer obtained above and 4950 g of toluene were placed, and they were heated to 130° C. to completely dissolve the resin. The resulting solution was cooled to 85° C. over a period of 1 hour, then cooled to 40° C. from 85° C. over a period of 4.5 hours, and cooled to 30° C. from 40° C. over a period of 30 minutes to obtain a resin dispersion. Measurement of a diameter of the dispersed particle in the dispersion by the use of a Coulter Counter resulted in 9 μm.

The resulting resin dispersion was applied to an aluminum foil (50 μm) using a bar coater, air dried, and then heated for 10 seconds in an air oven set at 200° C. to obtain a uniformly coated foil. The coated foil and a LLDPE sheet (produced by Akosu Kogyo K.K., thickness: 300 μm) were heat bonded at a temperature of 100 to 200° C. for 1 second under a pressure of 1 kg/cm² in accordance with a method of JIS Z1707, to prepare a sample. The 180° peel strength of the sample was measured at ordinary temperature. The results are set forth in Table 1.

COMPARATIVE EXAMPLE 1

Preparation of Ethylene/1-butene Random Copolymer

In a polymerization reactor, a mixed gas of ethylene and 1-butene and a hydrogen gas were added to hexane (polymerization solvent), and polymerization of ethylene and 1-butene was continuously conducted under the conditions of a temperature of 40° C., a pressure of 5 kg/cm² and a residence time of 1 hour using a polymerization catalyst comprising vanadium oxytrichloride and ethylaluminum sesquichloride. Then, the solvent was removed from the reaction solution to obtain the desired ethylene/1-butene random copolymer.

The copolymer thus obtained had a 1-butene content of 11.5% by mol, an intrinsic viscosity (η), as measured in decalin at 135° C., of 1.47 dl/g, a glass transition temperature of −60° C., a crystallinity, as measured by X-ray diffractometry, of 2%, and a B value of 1.1.

Preparation of Maleic Anhydride Graft Modified Ethylene/1-butene Random Copolymer A modified copolymer was synthesized in the same manner as in Example 1, except that the ethylene/1-octene random copolymer was replaced with the ethylene/1-butene random copolymer. The modified random copolymer had an intrinsic viscosity (η) of 1.4 dl/g and a maleic anhydride graft quantity of 0.9% by weight.

Then, preparation of a resin dispersion and evaluation thereof were carried out in the same manner as in Example 1. The results are set forth in Table 1.

TABLE 1

| | Heat sealing temperature (° C.) | | | | | |
|---|---|---|---|---|---|---|
| | 100 | 120 | 140 | 160 | 180 | 200 |
| Ex. 1 | 250 | 2300 | 2500 | 2500 | 3000 | 3000 |
| Comp. Ex. 1 | 50 | 700 | 1500 | 2000 | 1800 | 1680 | unit: g/15 mm

Example 2

A resin dispersion was prepared in the same manner as in Example 1. This resin dispersion was applied to each of an aluminum foil and an ink-coated aluminum foil using a roll coater to form a coating film similarly to Example 1.

Then, the aluminum foil and a LLDPE sheet were laminated together by means of the coating film in the same manner as in Example 1 to prepare a sample 1. Separately, the aluminum foil and a polypropylene sheet were laminated together by means of the coating film in the same manner as in Example 1 to prepare a sample 2. Separately, the ink-coated aluminum foil and a LLDPE sheet were laminated together by means of the coating film in the same manner as in Example 1 to prepare a sample 3. In each case, the heat sealing temperature was 140° C.

The samples 1 to 3 obtained above were measured on the adhesion properties. The results are set forth in Table 2.

TABLE 2

| | Adhesion Strength |
|---|---|
| Sample 1 | 2500 g/15 mm |
| Sample 2 | 1700 g/15 mm |
| Sample 3 | 1600 g/15 mm |

What is claimed is:

1. A resin dispersion comprising solid particles of a graft modified ethylene/α-olefin random copolymer dispersed in an organic solvent, wherein the graft modified ethylene/α-olefin random copolymer has the following properties:

the copolymer contains components derived from ethylene and an α-olefin of 6 to 20 carbon atoms, the content of the ethylene component is in the range of 75 to 97% by mol, and the content of the α-olefin component is in the range of 3 to 25% by mol, each content being based on 100% by mol of the total of both components, the intrinsic viscosity (q) as measured in decalin at 135° C. is in the range of 0.2 to 5.0 dl/g, the crystallinity as measured by X-ray diffractometry is less than 30%, the copolymer contains a graft component derived from a polar monomer, and the content of the polar monomer graft component is in the range of 0.1 to 15% by weight and the particles of the copolymer have particle diameters measured by a Coulter Counter of 5 to 50 μm.

2. The resin dispersion as claimed in claim 1, wherein the graft modified ethylene/α-olefin random copolymer further has the following properties:

the glass transition temperature (Tg) is not higher than −40° C., the crystallinity as measured by X-ray diffractometry is less than 30%, and the molecular weight distribution (Mw/Mn) as measured by GPC is not more than 3.

3. The resin dispersion as claimed in claim 2, wherein the graft modified ethylene/α-olefin random copolymer further has the following properties:

the B value as calculated from the following equation is in the range of 1.0 to 1.4:

$$B\ value = POE/(2PO \cdot PE)$$

wherein POE, 2PO and PE are each a parameter determined from the $^{13}$C-NMR spectrum, PE and PO are a molar fraction of ethylene and a molar fraction of the α-olefin, respectively, to the total number of moles of the ethylene component and the α-olefin contained in the modified ethylene/α-olefin random copolymer, and POE is a proportion of the number of ethylene/α-olefin alternating sequences to the number of all dyad sequences.

4. The resin dispersion as claimed in claim 1, wherein the solid concentration of the resin dispersion is in the range of 3 to 50% by weight.

5. The resin dispersion as claimed in claim 1, wherein the ethylene/α-olefin random copolymer has been prepared by the use of metallocene catalyst.

6. A process for preparing a resin dispersion, comprising grafting a polar monomer on an unmodified ethylene/α-olefin random copolymer having the following properties:

the copolymer contains components derived from ethylene and an α-olefin of 6 to 20 carbon atoms, the content of the ethylene component is in the range of 75 to 97% by mol, and the content of the α-olefin component is in the range of 3 to 25% by mol, each content being based on 100% by mol of the total of both components, the intrinsic viscosity (n) as measured in decalin at 135° C. is in the range of 0.2 to 5.0 dl/g, and the crystallinity as measured by X-ray diffractometry is less than 30%, to prepare a graft modified ethylene/α-olefin random copolymer containing 0.1 to 15% by weight of a graft component derived from the polar monomer and having particle diameter measured by a Coulter Counter of 5 to 50 μm, and then dispersing solid particles of the graft modified copolymer in an organic solvent.

7. The process for preparing a resin dispersion as claimed in claim 6, wherein the unmodified ethylene/α-olefin random copolymer further has the following properties:

the glass transition temperature (Tg) is not higher than −40° C., the crystallinity as measured by X-ray diffractometry is less than 30%, and the molecular weight distribution (Mw/Mn) as measured by GPC is not more than 3.

8. The process for preparing a resin dispersion as claimed in claim 7, wherein the unmodified ethylene/α-olefin random copolymer further has the following properties:

the B value as calculated from the following equation is in the range of 1.0 to 1.4:

$$B\text{ value}=POE/(2PO \cdot PE)$$

wherein POE, 2PO and PE are each a parameter determined from the $^{13}$C-NMR spectrum, PE and PO are a molar fraction of ethylene and a molar fraction of the α-olefin, respectively, to the total number of moles of the ethylene component and the α-olefin contained in the modified ethylene/α-olefin random copolymer, and POE is a proportion of the number of ethylene/α-olefin alternating sequences to the number of all dyad sequences.

9. The process for preparing a resin dispersion as claimed in claim 8, wherein the unmodified ethylene/α-olefin random copolymer is a linear ethylene/α-olefin random copolymer having the following properties:

the ratio (gη* (=(η)/(η)blank) of the intrinsic viscosity (η) measured as the intrinsic viscosity (η) blank of a linear ethylene/propylene copolymer having the same weight-average molecular weight by light scattering method as that of the unmodified ethylene/α-olefin random copolymer and having an ethylene content of 70% by mol is a value exceeding 0.95.

10. A process for producing a resin-coated metal plate, comprising applying the resin dispersion of claim 1 to a metal plate to form a coating film.

11. The process for producing a resin-coated metal plate as claimed in claim 10, wherein a finish coating is applied to the coating film to form a finish layer.

12. A process for producing a laminate, comprising applying the resin dispersion of claim 1 to a metal plate to form an adhesive layer and laminating a polyolefin sheet or film on the metal plate by means of the adhesive layer.

13. The resin dispersion as claimed in claim 1, wherein the polar monomer is maleic anhydride.

14. The process for preparing a resin dispersion as claimed in claim 6, wherein the polar monomer is maleic anhydride.

* * * * *